(12) United States Patent
Walcome

(10) Patent No.: US 11,542,689 B2
(45) Date of Patent: Jan. 3, 2023

(54) FIRE-SUPPRESSION WATER-INTAKE VALVE, FIRE-SUPPRESSION SPRINKLER HEAD CONFIGURED FOR RAPID INSTALLATION IN, AND RAPID REMOVAL FROM, THE WATER-INTAKE VALVE WITHOUT THE NEED TO INTERRUPT THE WATER SUPPLY, AND RELATED SYSTEMS AND METHODS

(71) Applicant: Aquor Water Systems, Incorporated, Port Townsend, WA (US)

(72) Inventor: Richard O. Walcome, Port Townsend, WA (US)

(73) Assignee: AQUOR WATER SYSTEMS, INCORPORATED, Port Townsend, WA (US)

( * ) Notice: Subject to any disclaimer, the term of this patent is extended or adjusted under 35 U.S.C. 154(b) by 0 days.

(21) Appl. No.: 15/940,664

(22) Filed: Mar. 29, 2018

(65) Prior Publication Data
US 2018/0280744 A1   Oct. 4, 2018

Related U.S. Application Data

(60) Provisional application No. 62/478,384, filed on Mar. 29, 2017, provisional application No. 62/478,381, filed on Mar. 29, 2017.

(51) Int. Cl.
*E03B 7/12* (2006.01)
*A62C 35/60* (2006.01)
(Continued)

(52) U.S. Cl.
CPC .............. *E03B 7/12* (2013.01); *A62C 35/60* (2013.01); *A62C 35/68* (2013.01); *A62C 37/11* (2013.01);
(Continued)

(58) Field of Classification Search
CPC .... E03B 7/12; A62C 35/60; A62C 35/68; A62C 37/11; F16K 11/14; F16L 37/2445;
(Continued)

(56) References Cited

U.S. PATENT DOCUMENTS 179,092 A    6/1876   Booth et al.
846,537 A    3/1907   Whiteford
(Continued)

FOREIGN PATENT DOCUMENTS

CN    104728455 A    6/2015
DE    102015006094 A1  9/2016

OTHER PUBLICATIONS

International Bureau, "International Preliminary Report on Patentability from PCT Application No. PCT/US2018/014112 dated Aug. 1, 2019", from Foreign Counterpart to U.S. Appl. No. 15/873,867, pp. 1-12, Published: WO.
(Continued)

*Primary Examiner* — Qingzhang Zhou
(74) *Attorney, Agent, or Firm* — Volpe Koenig

(57) ABSTRACT

An embodiment of a fire-suppression water-intake valve includes a receptacle and a valve assembly. The receptacle is configured to receive a sprinkler head. And the valve assembly is configured to close in response to removing a sprinkler head from the receptacle, and is configured to open in response to installing a sprinkler head in the receptacle. Such a fire-suppression water-intake valve can allow quick and easy removal and installation of a fire-suppression sprinkler head without shutting a water supply to the valve.

20 Claims, 14 Drawing Sheets

(51) Int. Cl.

| | | |
|---|---|---|
| A62C 35/68 | (2006.01) | |
| A62C 37/11 | (2006.01) | |
| F16K 11/14 | (2006.01) | |
| F16L 37/244 | (2006.01) | |
| F16L 37/48 | (2006.01) | |
| F16L 37/50 | (2006.01) | |
| E03C 1/04 | (2006.01) | |

(52) U.S. Cl.
CPC .......... *F16K 11/14* (2013.01); *F16L 37/2445* (2013.01); *F16L 37/48* (2013.01); *F16L 37/505* (2013.01); *E03C 2001/0416* (2013.01)

(58) Field of Classification Search
CPC .. F16L 37/48; F16L 37/505; E03C 2001/0416
See application file for complete search history.

(56) References Cited

U.S. PATENT DOCUMENTS

| | | | |
|---|---|---|---|
| 874,652 A | 12/1907 | Bailey | |
| 968,711 A | 8/1910 | Stevenson | |
| 1,067,583 A | 7/1913 | Brague | |
| 1,263,792 A | 4/1918 | Mueller | |
| 1,788,449 A | 1/1931 | Catlin | |
| 2,034,933 A | 3/1936 | Wilson | |
| 2,292,674 A | 8/1942 | Terrell et al. | |
| 2,630,131 A | 3/1953 | Snyder | |
| 3,106,935 A | 10/1963 | Gatzke | |
| 3,199,831 A | 8/1965 | Sully | |
| 3,494,373 A | 2/1970 | Horak et al. | |
| 3,589,615 A | 6/1971 | Cummins | |
| 4,112,966 A | 9/1978 | Carlson | |
| 4,178,956 A | 12/1979 | Fillman | |
| 4,298,166 A | 11/1981 | White et al. | |
| 4,473,244 A | 9/1984 | Hill | |
| 4,562,962 A * | 1/1986 | Hartman | B05B 1/3006 239/207 |
| 4,644,970 A | 2/1987 | Lowry | |
| 4,700,732 A | 10/1987 | Francisco | |
| 4,844,116 A | 7/1989 | Buehler et al. | |
| 4,909,270 A | 3/1990 | Enterante, Sr. et al. | |
| 4,971,097 A | 11/1990 | Hunley, Jr. et al. | |
| 5,029,603 A | 7/1991 | Ackroyd | |
| 5,158,105 A | 10/1992 | Conway | |
| 5,372,158 A | 12/1994 | Berfield | |
| 5,533,546 A | 7/1996 | Dixon | |
| 5,740,831 A | 4/1998 | DeNardo et al. | |
| 5,765,816 A | 6/1998 | Chrysler | |
| 5,836,397 A * | 11/1998 | Craig | A62C 35/60 169/5 |
| 6,024,175 A * | 2/2000 | Moore, Jr. | A62C 37/20 169/37 |
| 6,178,982 B1 * | 1/2001 | Longstreth | B05B 1/304 137/71 |
| 6,250,688 B1 * | 6/2001 | Kirby | F16L 49/06 285/148.21 |
| 6,394,132 B1 * | 5/2002 | Walcome | F16L 37/252 137/614.2 |
| 6,450,264 B1 | 9/2002 | Christian | |
| 6,536,534 B1 * | 3/2003 | Sundholm | A62C 35/68 169/37 |
| 6,644,340 B2 | 11/2003 | Rokkjaer | |
| 6,752,167 B1 | 6/2004 | Stanaland et al. | |
| 6,808,127 B2 | 10/2004 | Mcnulty et al. | |
| 7,331,399 B2 | 2/2008 | Multer | |
| 8,931,571 B2 * | 1/2015 | Sarkisyan | A62C 35/68 239/203 |
| 2002/0040732 A1 | 4/2002 | King, Jr. | |
| 2006/0042693 A1 | 3/2006 | Holland et al. | |
| 2006/0201553 A1 | 9/2006 | Poskin et al. | |
| 2006/0255658 A1 | 11/2006 | Klee | |
| 2007/0056631 A1 | 3/2007 | Seppmann | |
| 2007/0246567 A1 | 10/2007 | Roberts | |
| 2008/0115835 A1 | 5/2008 | Wu | |
| 2008/0245418 A1 | 10/2008 | Lawson | |
| 2010/0096028 A1 | 4/2010 | Qiu | |
| 2014/0144520 A1 | 5/2014 | Marchand | |
| 2014/0262359 A1 | 9/2014 | Poncia et al. | |
| 2016/0225895 A1 | 8/2016 | He et al. | |
| 2016/0327164 A1 | 11/2016 | Tyers | |
| 2017/0326391 A1 * | 11/2017 | Briscoe | A62C 31/02 |
| 2018/0179741 A1 | 6/2018 | Kim | |
| 2018/0202133 A1 | 7/2018 | Walcome | |

OTHER PUBLICATIONS

U.S. Patent and Trademark Office, "Office Action", U.S. Appl. No. 15/873,867, dated Sep. 16, 2019, pp. 1-47, Published: US.

International Bureau, "International Preliminary Report on Patentability from PCT Application No. PCT/US2018/025269 dated Oct. 10, 2019", from Foreign Counterpart to U.S. Appl. No. 15/940,647, pp. 1-8, Published: WO.

International Bureau, "International Preliminary Report on Patentability from PCT Application No. PCT/US2018/025271 dated Oct. 10, 2019", from Foreign Counterpart to U.S. Appl. No. 15/940,664, pp. 1-9, Published: WO.

International Searching Authority; Notification of Transmittal of the International Search Report and the Written Opinion of the International Searching Authority, or the Declaration from PCT Application No. PCT/US2018/014112 dated May 7, 2018; from Foreign Counterpart of U.S. Appl. No. 15/873,867; dated May 7, 2018; pp. 1-20; Published: PCT.

International Searching Authority; "Notification of Transmittal of the International Search Report and the Written Opinion of the International Searching Authority" from PCT Application No. PCT/US2018/025271 dated Jun. 22, 2018; from Foreign Counterpart of U.S. Appl. No. 15/940,664; pp. 1-15; dated Jun. 22, 2018; Published: US.

Walcome, "Anti-Freezing Water Valve Configured for Underground (Buried) Use and With Optional Anti-Siphon Assembly, and Water-Valve Accessories", U.S. Appl. No. filed on Mar. 29, 2018, pp. 1-65, Published in:US.

Walcome, "Anti-Freezing Water Valve With Optional Anti-Siphon Assembly and Water-Valve Accessories", U.S. Appl. No. 15/873,867, filed Jan. 17, 2018, pp. 1-54, Published in US.

International Searching Authority; "Notification of the International Search Report and the Written Opinion of the International Searching Authority, or the Declaration from PCT Application No. PCT/US2018/025269 dated Aug. 8, 2018"; from Foreign Counterpart of U.S. Appl. No. 15/940,647; pp. 1-15; dated Aug. 8, 2018; Published: US.

U.S. Patent and Trademark Office, "Office Action", U.S. Appl. No. 15/940,647, dated Jun. 1, 2020, pp. 1 through 51, Published: US.

U.S. Patent and Trademark Office, "Office Action", U.S. Appl. No. 15/940,647, dated Dec. 10, 2020, pp. 1 through 23, Published: US.

U.S. Patent and Trademark Office, "Office Action", U.S. Appl. No. 15/873,867, dated Nov. 30, 2020, pp. 1 through 21, Published: US.

U.S. Patent and Trademark Office, "Notice of Allowance", U.S. Appl. No. 15/940,647, dated Jul. 28, 2021, pp. 1 through 20, Published: US.

U.S. Patent and Trademark Office, "Notice of Allowance", U.S. Appl. No. 15/873,867, dated Oct. 6, 2021, pp. 1 through 11, Published: US.

U.S. Patent and Trademark Office, "Notice of Allowance", U.S. Appl. No. 15/873,867, dated May 28, 2021, pp. 1 through 16, Published: US.

U.S. Patent and Trademark Office, "Restriction Requirement", U.S. Appl. No. 15/940,647, dated Jan. 8, 2020, pp. 1-5, Published: US.

U.S. Patent and Trademark Office, "Final Office Action", U.S. Appl. No. 15/873,867, dated Apr. 16, 2020, pp. 1 through 35, Published: US.

U.S. Patent and Trademark Office, "Advisory Action", U.S. Appl. No. 15/873,867, dated Aug. 21, 2020, pp. 1 through 8, Published: US.

* cited by examiner

FIRE-SUPPRESSION WATER-INTAKE VALVE, FIRE-SUPPRESSION SPRINKLER HEAD CONFIGURED FOR RAPID INSTALLATION IN, AND RAPID REMOVAL FROM, THE WATER-INTAKE VALVE WITHOUT THE NEED TO INTERRUPT THE WATER SUPPLY, AND RELATED SYSTEMS AND METHODS

PRIORITY CLAIM AND CROSS-RELATED APPLICATIONS

This application claims benefit of priority to the following U.S. patent applications, which are incorporated by reference: U.S. Provisional Patent Application Ser. No. 62/478,381, entitled "ANTI-FREEZING WATER VALVE CONFIGURED FOR UNDERGROUND (BURIED) USE AND WITH OPTIONAL ANTI-SIPHON ASSEMBLY," filed 29 Mar. 2017; and U.S. Provisional Patent Application Ser. No. 62/478,384, entitled "FIRE SUPPRESSION SPRINKLER ASSEMBLY INCLUDING A SPRINKLER HEAD CONFIGURED FOR RAPID INSTALLATION AND REPLACEMENT WITHOUT THE NEED TO INTERRUPT THE WATER SUPPLY," filed 29 Mar. 2017.

This application is related to the following U.S. Patent Applications, which are incorporated by reference: U.S. Utility patent application Ser. No. 15/873,867, entitled "ANTI-FREEZING WATER VALVE WITH OPTIONAL ANTI-SIPHON ASSEMBLY AND WATER-VALVE ACCESSORIES," filed 17 Jan. 2018; and U.S. Utility patent application Ser. No. 15/940,647, entitled "ANTI-FREEZING WATER VALVE CONFIGURED FOR UNDERGROUND (BURIED) USE AND WITH OPTIONAL ANTI-SIPHON ASSEMBLY, AND WATER-VALVE ACCESSORIES," filed Mar. 29, 2018.

SUMMARY

An embodiment of a fire-suppression sprinkler assembly includes a water-intake valve, a sprinkler head, and an optional decorative cover. The water-intake valve is configured to open automatically when the sprinkler head is installed, and to remain open while the sprinkler head remains installed; and the water-intake valve is configured to close automatically when the sprinkler head is removed, and to remain closed while no sprinkler head is installed. Furthermore, the sprinkler head and water-intake valve can be configured to allow one to install or remove the sprinkler head from the water-intake valve by twisting the sprinkler head relative to the water-intake valve.

Such a sprinkler assembly has one or more advantages as compared to a conventional fire-suppression sprinkler assembly. Because the water-intake valve automatically remains closed while no sprinkler head is installed therein, a separate pipe-capping step is not required before pressure testing a fire-suppression sprinkler system that includes one or more of the sprinkler assemblies. Furthermore, because the water-intake valve automatically opens when a sprinkler head is installed and automatically closes when a sprinkler head is removed, one can install or remove a sprinkler head without "turning off" a water supply to the sprinkler system. And, where the sprinkler head and water-intake valve are configured for twist connecting, one can install or remove the sprinkler head by hand, without a ladder, and without the need to apply a sealant to a threaded connection.

An embodiment of a fire-suppression-sprinkler-system sprinkler assembly includes a water-intake valve, a sprinkler head, and an optional decorative cover. The water-intake valve is configured to open automatically when the sprinkler head is installed, and to remain open while the sprinkler head remains installed; and the water-intake valve is configured to close automatically when the sprinkler head is removed, and to remain closed while no sprinkler head is installed. Furthermore, the sprinkler head and water-intake valve can be configured to allow one to install or remove the sprinkler head from the water-intake valve by twisting the sprinkler head relative to the water-intake valve with a tool that allows one to install or remove the sprinkler head without a ladder.

An embodiment of a fire-suppression water-intake valve includes a receptacle and a valve assembly. The receptacle is configured to receive a sprinkler head. And the valve assembly is configured to close in response to removing a sprinkler head from the receptacle.

Another embodiment of a fire-suppression water-intake valve includes a receptacle and a valve assembly. The receptacle is configured to receive a sprinkler head. And the valve assembly is configured to open in response to installing a sprinkler head in the receptacle.

Yet another embodiment of a fire-suppression water-intake valve includes a receptacle and a valve assembly. The receptacle is configured to receive a sprinkler head. And the valve assembly is configured to be closed in response to an absence of a sprinkler head from the receptacle.

Such fire-suppression water-intake valves can allow quick and easy removal and installation of a fire-suppression sprinkler head without shutting a water supply to the valve.

An embodiment of a fire-suppression sprinkler head includes a body, and at least one engager configured to engage a fire-suppression water-intake valve and to cause the body to open the fire-suppression water-intake valve.

Another embodiment of a fire-suppression sprinkler head includes a body, and at least one first engager configured to engage a fire-suppression water-intake valve and to urge the body into the fire-suppression water-intake valve.

Such fire-suppression sprinkler head can be installed in, and removed from, a fire-suppression water-intake valve quickly and easily without a need to shut a water supply to the fire-suppression water-intake valve.

DETAILED DESCRIPTION

In the following description, "approximately," "approximately," "about," and "substantially" mean that a quantity (e.g., a length) can vary from a given value (e.g., 10 feet) by up to ±20% (e.g., ±20% of 10 feet=1 foot, which means an "approximate" value of 10 feet can range from 10−1=9 feet to 10+1=11 feet).

Figure 1:
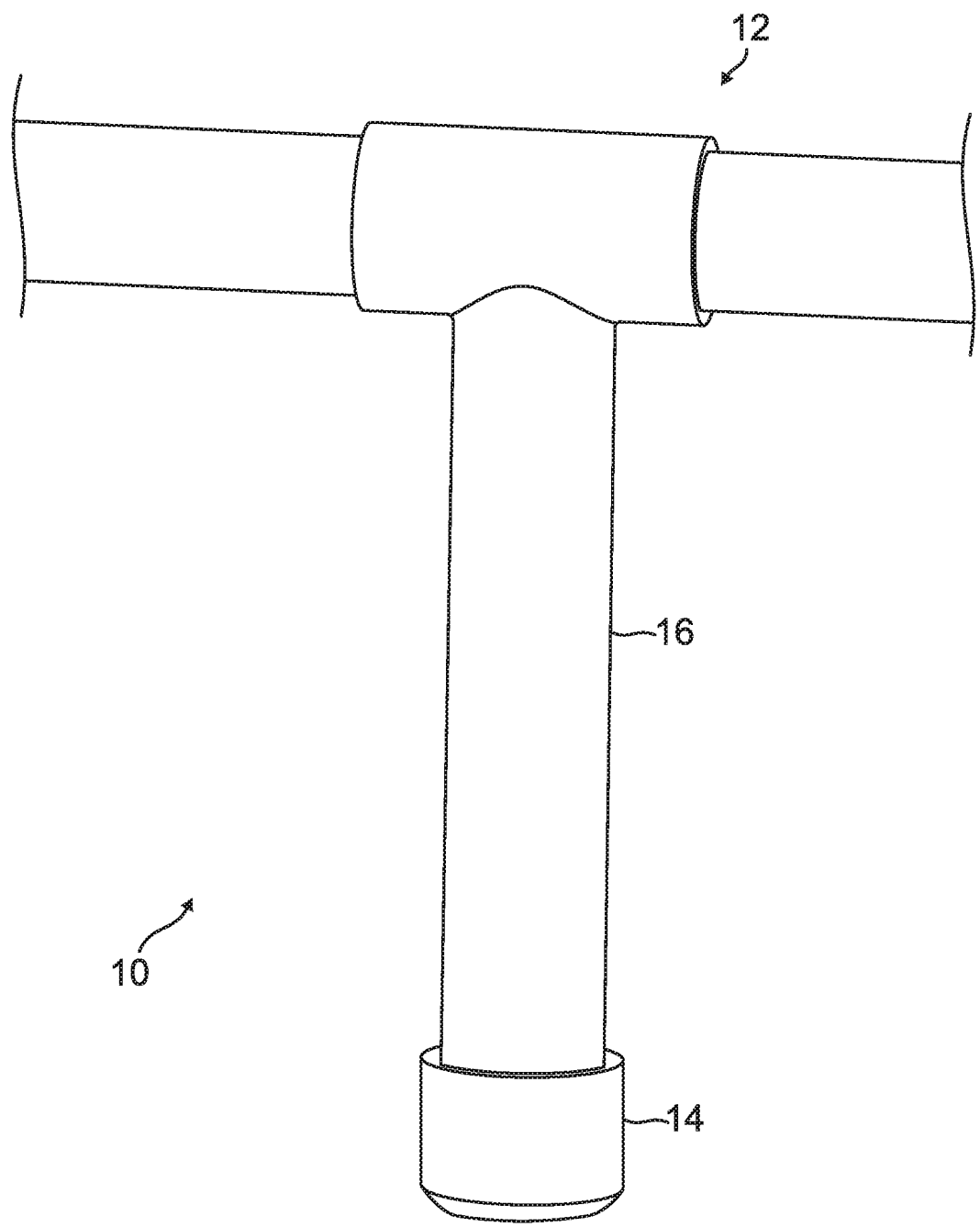
FIG. 1 is an isometric view of a sprinkler-head section of a conventional fire-suppression sprinkler system before installation of a sprinkler head, according to an embodiment.

FIG. 1 is an isometric view of a sprinkler-head section 10 of a fire-suppression-sprinkler system 12 (hereinafter "sprinkler system") before a sprinkler head is installed, according to an embodiment.

The building and construction codes of most municipalities in the United States (and in many other countries) require that after a fire-suppression sprinkler system, such as the sprinkler system 12, is installed in a building, the system be pressure tested before the sprinkler heads are installed.

Therefore, a plumber, or other construction professional, installs a respective cap 14 on the end of each sprinkler-head extension pipe 16 before performing the pressure test. Installation of a cap 14 can take, for example, between two and fifteen minutes depending on whether the cap is installed on the pipe 16 before or after the sprinkler system 12 is installed, and, if the cap is installed on the pipe after the sprinkler system is installed, whether, for example, a ladder is needed to install the cap.

After all of the caps 14 are installed, the contractor fills the fire-suppression system 12 with water at the test pressure(s) that the applicable building or construction code specifies.

Next, the contractor drains the fire-suppression system 12 so that when a plumber removes the caps 14 to install the sprinkler heads, water from the fire-suppression system 12 does not leak all over the floor.

Then, after the fire-suppression system 12 drains, a plumber removes each cap 14 from each respective extension pipe 16, and installs a respective sprinkler head (not shown in FIG. 1) on each extension pipe.

Next, the contractor opens the water supply to the fire-suppression system 12, and checks the system for leaks.

After the fire-suppression system 12 is operational, to remove an activated, or otherwise leaking, sprinkler head, a plumber first closes the water supply to, and drains, the fire-suppression system (or closes the water supply to, and drains, a branch of the fire-suppression system where the leaking sprinkler head is located and that can be isolated by one or more water valves). But between the time that the plumber is notified of the leak and the time that the fire-suppression system 12 is drained, a significant amount of water may have leaked via the sprinkler head, and a significant amount of water damage may have accrued.

Next, after the fire-suppression system 12 is drained, the plumber typically obtains and climbs a ladder, uses a wrench or other tool to unscrew the sprinkler head from the extension pipe 16, applies sealant (e.g., Teflon® tape) to the threads of the replacement sprinkler head, and uses the wrench or other tool to screw the replacement sprinkler head onto the extension pipe.

Then, the plumber reopens the water supply to the fire-suppression system 12 and checks the newly installed sprinkler head for leaks.

And if the leaking sprinkler head caused any water damage, the building owner typically repairs the damage. Although the building owner may have insurance that covers some or all of the cost of the repair, the building owner may lose use of, or income (e.g., rent) from a tenant of, the water-damaged space. And if the water damage occurs while the building is still under construction, then the water damage may delay the completion of the building.

As evident from the above description, there are problems with the fire-suppression system 12. For example, a builder may incur significant extra costs for capping and uncapping the extension pipes 16 as compared to installing the sprinkler heads from the start. Furthermore, when a sprinkler head is activated, or otherwise leaks, the minimum time required to stop the leak after its discovery can be long enough to cause significant water damage to real and personal property. And removal and replacement of a sprinkler head may require cleaning and preparing the threads of the extension pipes 16 and of the sprinkler-head connectors.

Therefore, a need has arisen for a sprinkler-head assembly that can be present within the fire-suppression system during a pressure test and that can be removed and installed without the need to close the water supply to the fire-suppression system (or to the branch of the system where the leak is located).

Figure 2:
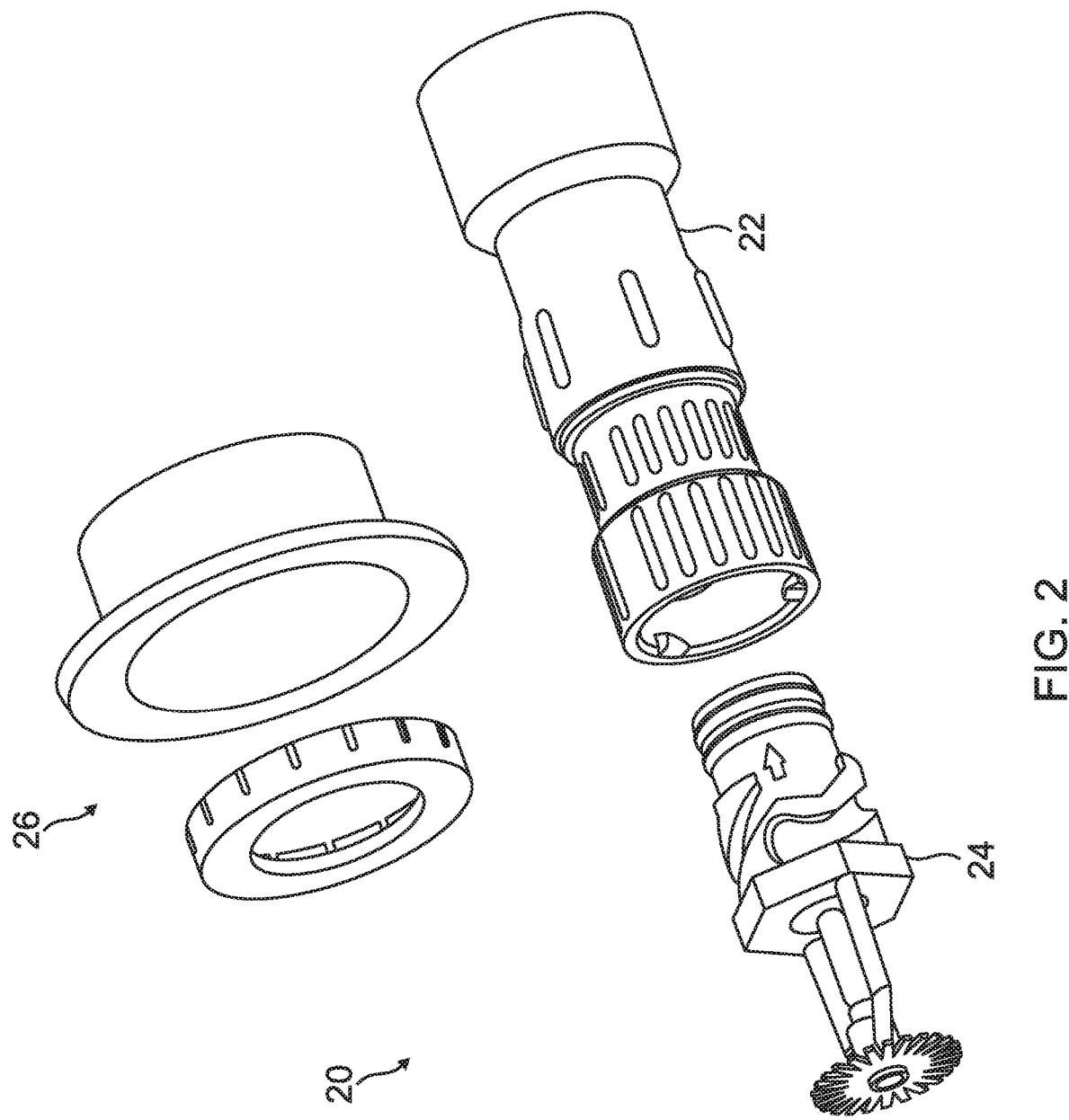
FIG. 2 is an exploded isometric view of a fire-suppression-sprinkler-system sprinkler-head assembly, according to an embodiment.

FIG. 2 is an exploded isometric view of a fire-suppression sprinkler-head assembly 20, according to an embodiment.

The sprinkler-head assembly 20 includes a water-intake valve 22, a sprinkler head 24, and an optional decorative cover assembly 26. The water-intake valve 22 is configured for attachment (e.g., by adhesive, welding, or threaded connection) to an extension pipe, such as the extension pipe 16 (FIG. 1), of a fire-suppression system, for automatic closing upon removal of the sprinkler head 24, and for automatic opening upon installation of the sprinkler head. The water-intake valve 22 can be made from any suitable material(s) such as metal (e.g., iron) or plastic (e.g., PVC).

The sprinkler head 24 is configured for installation into the water-intake valve 22 by rotating in one direction (e.g., clockwise), and is configured for removal from the water-intake valve by rotating in the opposite direction (e.g., counterclockwise). The sprinkler head 24 can be made from any suitable material such as metal(s) (e.g., iron) or plastic (e.g., PVC); and other than the portion of the sprinkler head 24 that connects to the water-intake valve 22, the sprinkler head can be the same as, or similar to, a conventional sprinkler head.

And the decorative cover assembly 26 can be formed from any suitable material(s) such as a metal (e.g., stainless steel) or plastic (e.g., PVC).

Still referring to FIG. 2, the sprinkler-head assembly 20 can reduce the severity of, or eliminate, the problems caused by prior sprinkler-head assemblies as described above in conjunction with FIG. 1. For example, because the water-intake valve 22 closes in response to one removing the sprinkler head 24 from the water-intake valve, and remains closed while no sprinkler is installed, a contractor can skip the costly and time-consuming steps of capping the fire-suppression system pipe extensions 16 with caps 14 and then uncapping the pipe extensions after pressure testing the fire-suppression system; that is, a plumber can install the water-intake valves 22 and the contractor can conduct the pressure test with the water-intake valves installed but before the plumber installs the sprinkler heads 24. Further because the water-intake valve 22 is, and remains, closed while no sprinkler head 24 is installed, one can remove a leaking sprinkler head quickly, with a simple twist, without first halting the water supply to the sprinkler system and allowing the sprinkler system to drain; the ability to remove the sprinkler head and to stop the leaking almost as soon as the leak is discovered can reduce the severity of, or eliminate, water damage caused by the leak. Moreover, because the water-intake valve 22 is opened in response to the installation of the sprinkler head 24, and remains open while the sprinkler head remains installed, one can replace a leaking sprinkler head relatively quickly and inexpensively without first halting the water supply to the sprinkler system (or to a corresponding branch thereof) and allowing the sprinkler system (or the corresponding branch thereof) to drain.

By eliminating, or significantly reducing the severity of, at least some of the problems associated with a traditional fire-suppressing sprinkler-head assembly, the sprinkler-head assembly 20 can save a contractor, builder, or building owner a significant amount of time and money. For example, the sprinkler-head assembly 20 can save the time and cost of capping and uncapping the extension pipes 16 incident to a test of the fire-suppression system 12 (FIG. 1), and can reduce or eliminate the time and cost for repairing water damage caused by a leaking sprinkler head 24.

Still referring to FIG. 2, alternate embodiments of the sprinkler-head assembly 20 are contemplated. For example, the decorative cover assembly 26 can be omitted from the sprinkler-head assembly 20.

Figure 3:
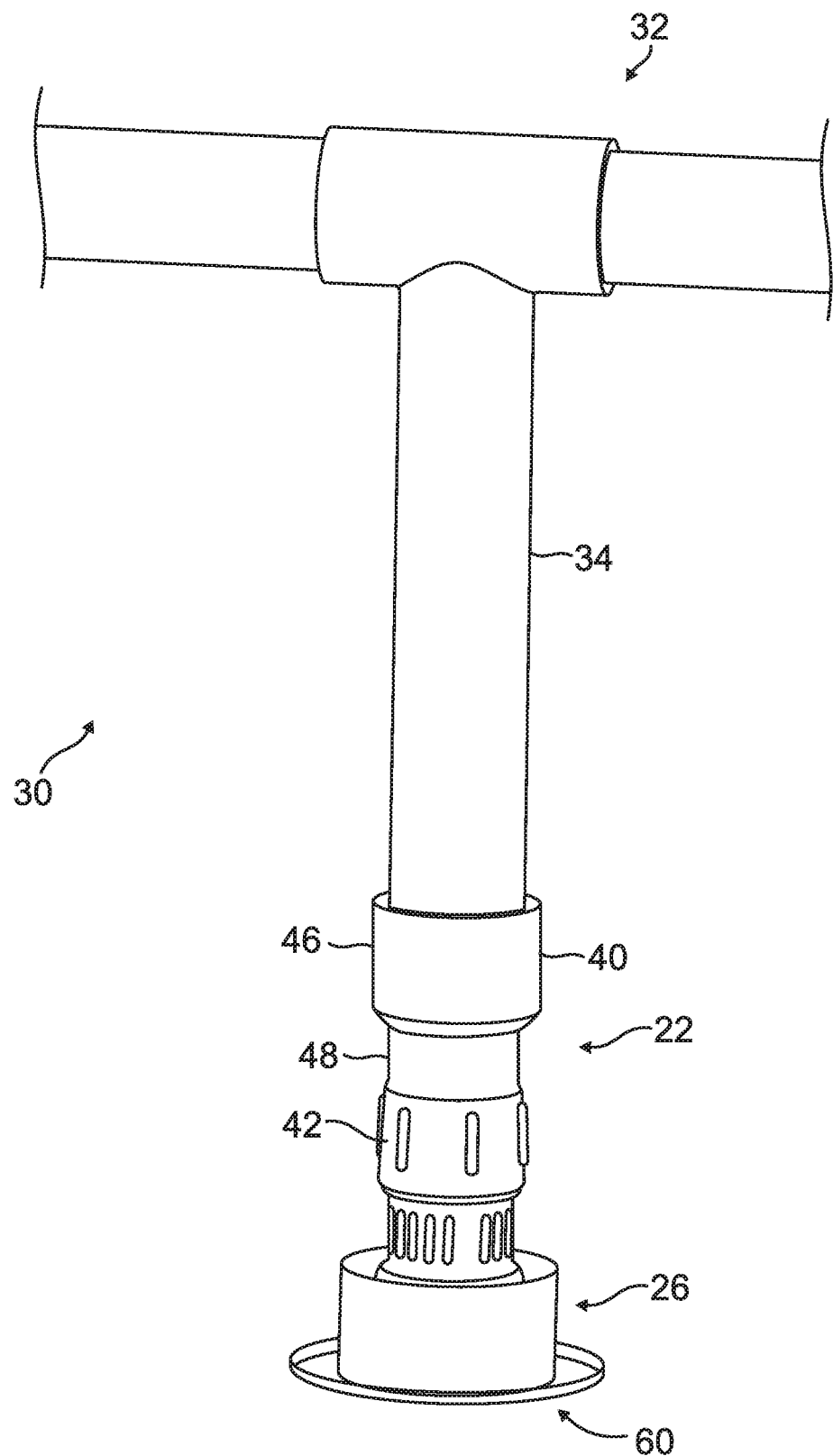
FIG. 3 is an isometric view of a sprinkler-head section of a fire-suppression sprinkler system, where the sprinkler-head section includes the water-intake valve of FIG. 2 before installation of the sprinkler head of FIG. 2, according to an embodiment.

FIG. 3 is an isometric view of a section 30 of a fire-suppression sprinkler system 32, where the section includes an extension pipe 34, the water-intake valve 22 (FIG. 2) attached to the extension pipe, and the decorative cover 26 (FIG. 2) attached to the water-intake valve, according to an embodiment.

Figure 4:
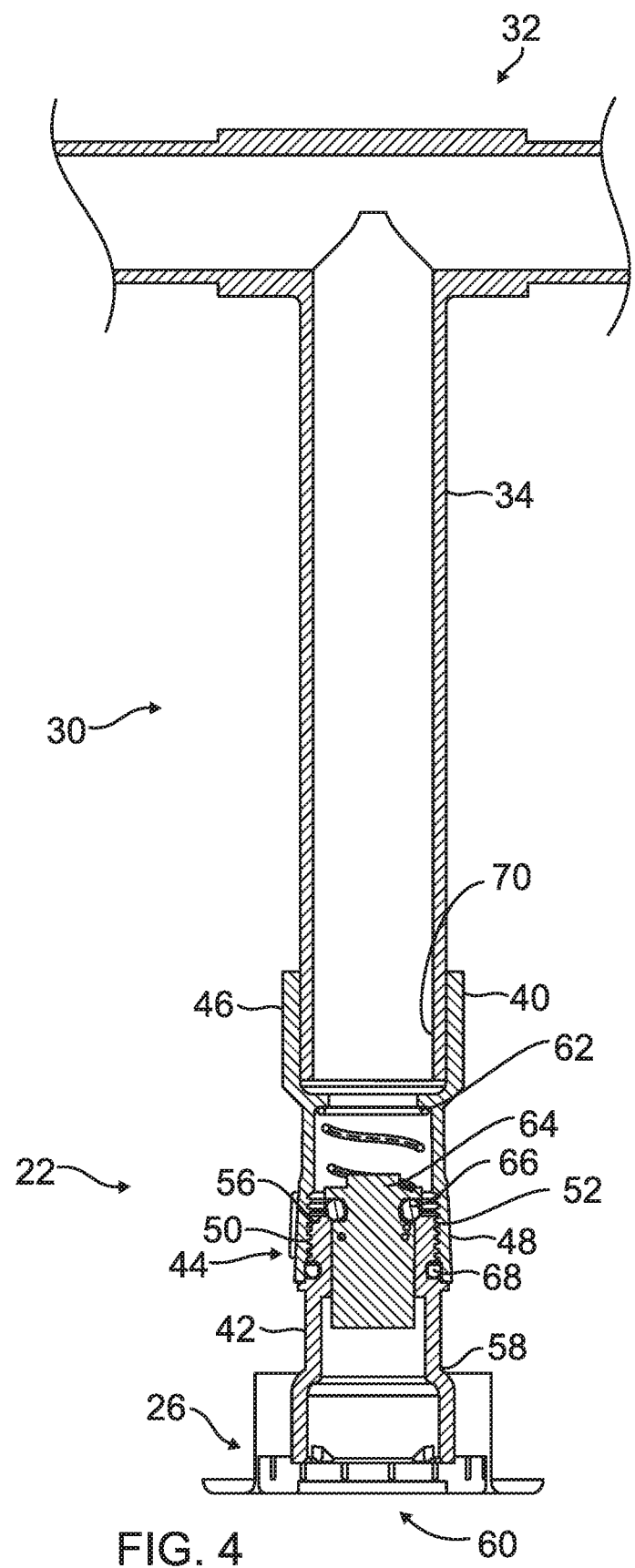
FIG. 4 is a cutaway side view the sprinkler-head section of FIG. 3, according to an embodiment.

FIG. 4 is a cutaway side view of the section 30 of FIG. 3, according to an embodiment.

Figure 5:
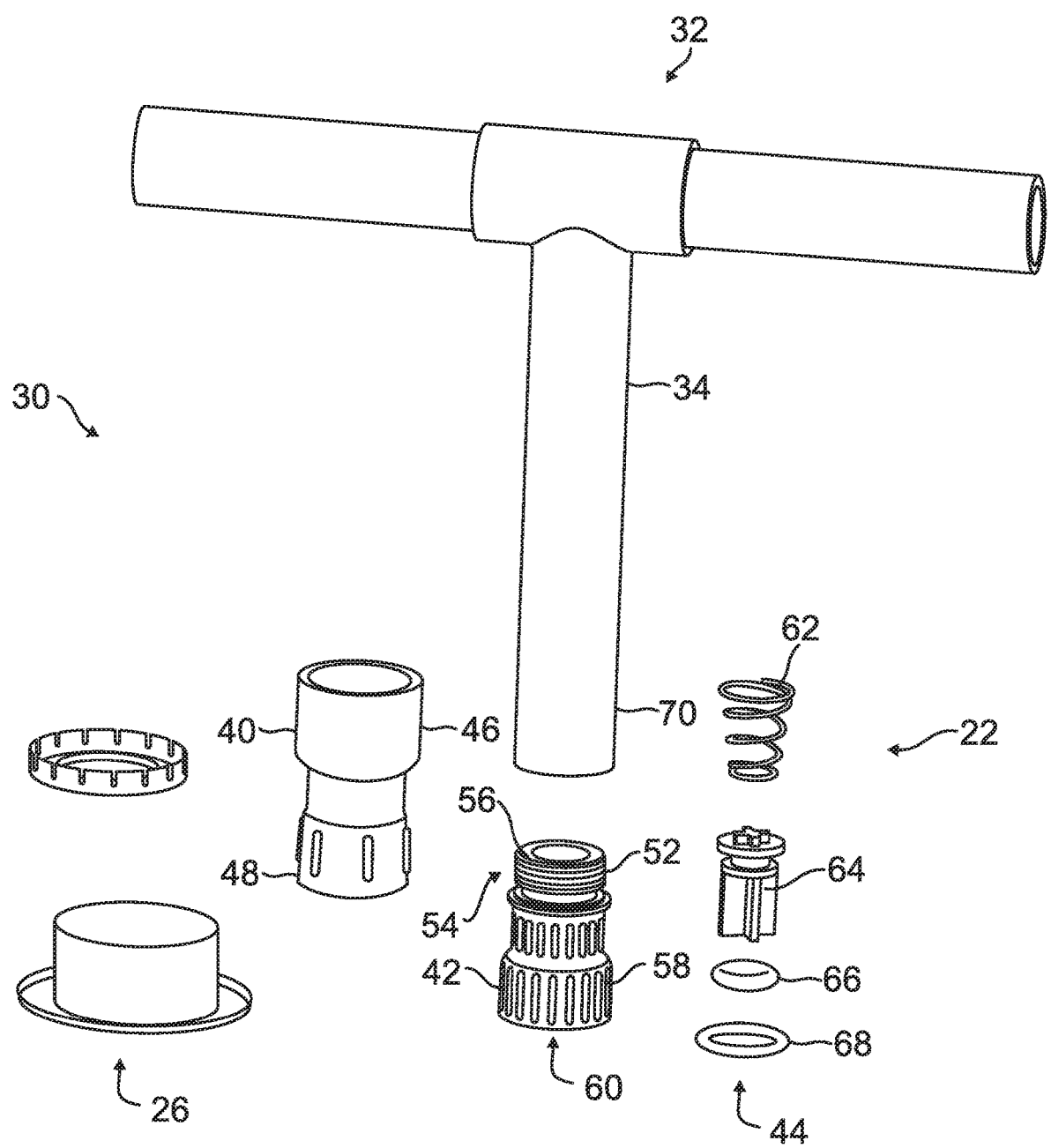
FIG. 5 is an exploded isometric view of the sprinkler-head sections of FIGS. 3-4, according to an embodiment.

FIG. 5 is an exploded view of the section 30 of FIGS. 3-4, according to an embodiment.

Referring to FIGS. 3-5, the structure of the water-intake valve 22 is described, according to an embodiment.

The water-intake valve 22 includes a connector 40, a valve body 42, and a valve assembly 44.

The connector 40 includes a top end 46 and a bottom end 48. The top end 46 is configured for attachment to the extension pipe 34 via welding or adhesive, and the bottom end 48 is configured for attachment to the valve body 42 via threads 50 and 52 of the bottom end and of the valve body, respectively. The connector 40 can be formed from any suitable material(s) such as metal (e.g., iron) or plastic (e.g., PVC).

The valve body 42 includes a top end 54, which includes the threads 52 and a sealing surface 56, and includes a bottom end 58, which defines a sprinkler-head receptacle 60.

The valve assembly 44 includes a spring 62, a plunger 64, a plunger seal 66, and a connector seal 68. The spring 62 and plunger 64 can be made from any suitable materials such as metal or plastic, and either or both of the plunger seal 66 and connector seal 68 can be a respective O-ring or other ring-type seal.

Still referring to FIGS. 3-5, a procedure for installing the water-intake valve 22, and the operation of the water-intake valve while the sprinkler head 24 (FIG. 2) is uninstalled in the water-intake valve, are described, according to an embodiment.

To install the water-intake valve 22, a plumber or other installer first ensures that the fire-suppression sprinkler system 32 (or a corresponding branch thereof) is disconnected (e.g., by a closed valve) from a water supply.

Next, the installer slips the top end 46 of the connector 40 over a bottom end 70 of the extension pipe 34, and secures the top end of the connector to the bottom end of the extension pipe with adhesive, or by welding or brazing.

Then, the installer places the valve assembly 44 into the valve body 42 (the spring 62 may already be disposed in the connector 40), and secures the valve body to the connector by rotating the valve body such that the threads 52 of the valve body engage the threads 50 of the connector.

Next, the installer pressurizes the fire-suppression sprinkler system 32 (e.g., for a pressure test, or for normal use).

The pressure of the water within the extension pipe 34 and the force exerted by the spring 62 combine to urge the plunger 64 toward the sealing surface 56, and, therefore, to urge the plunger seal 66 against the sealing surface.

The seal formed by the plunger seal 66 and the sealing surface 56 prevents water from flowing from the fire-suppression sprinkler system 32, through the extension pipe 34 and the water-intake valve 22, and out from the receptacle 60. Furthermore, the seal 68 prevents water from leaking by the threads 50 and 52 of the connector 40 and the valve body 42, respectively.

Because the closing of the water-intake valve 22 is reinforced by water pressure in the extension pipe 34, a contractor can conduct a pressure test of the fire-suppression system 32 without the need to cap the extension pipe; that is, the water-intake valve acts as a cap. Therefore, as described above, the water-intake valve 22 is configured to allow the contractor to omit the capping and uncapping steps of a traditional pressure test of a traditional fire-suppression system, and to realize the time and cost savings that omitting the capping and uncapping steps affords.

Still referring to FIGS. 3-5, alternate embodiments of the water-intake valve 22 and the water-intake-valve installation procedure are contemplated. For example, instead of attaching the connector 40 to the extension pipe 34 before attaching the valve body 42 to the connector, an installer can attach the valve body to the connector before attaching the connector to the extension pipe.

Figure 6:
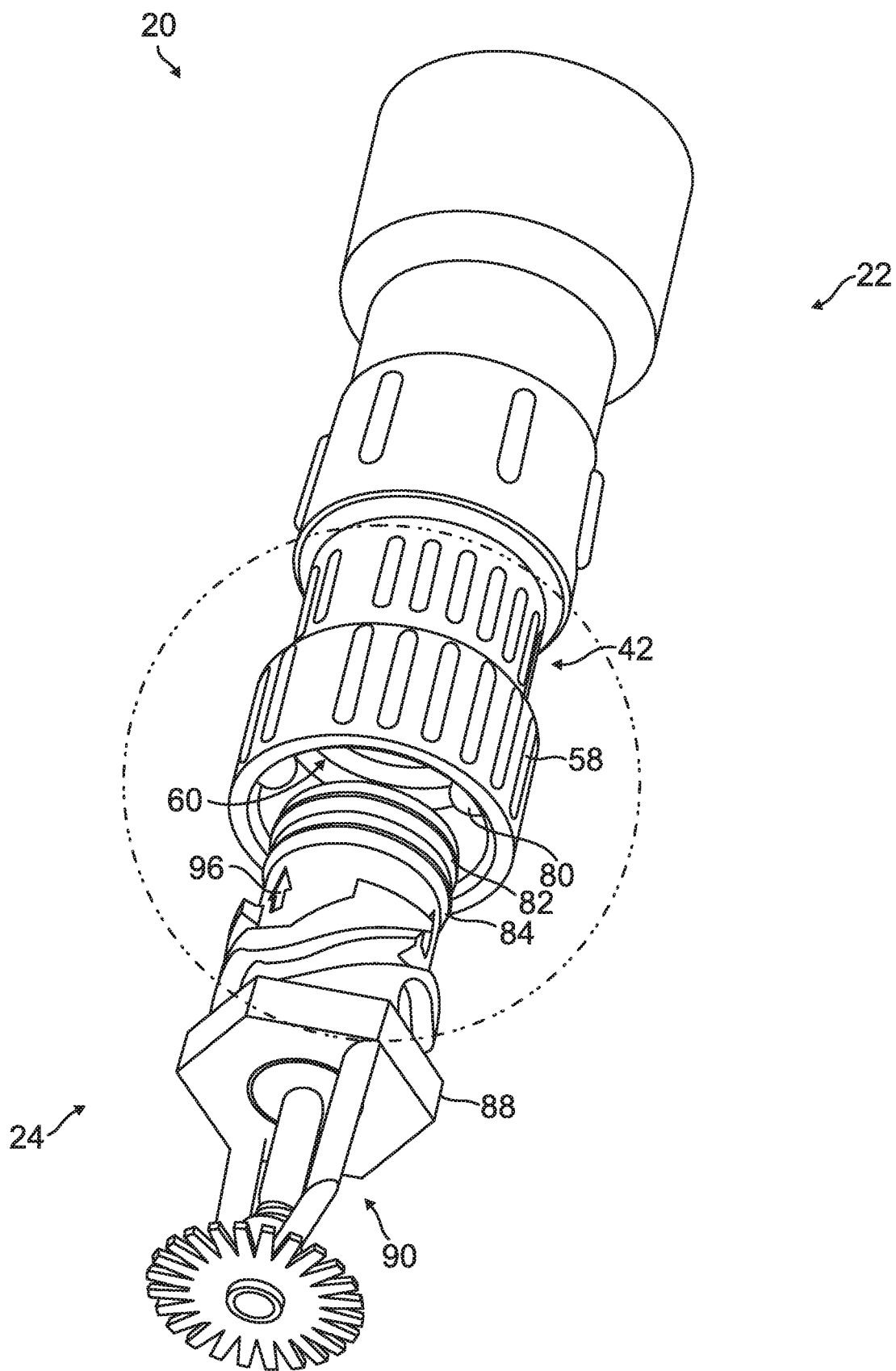
FIG. 6 is an exploded isometric view of the sprinkler-head assembly of FIGS. 2 and 5, the view illustrating a procedure for attaching the sprinkler head to the water-intake valve, according to an embodiment.

FIG. 6 is an exploded isometric view of the sprinkler-head assembly 20 of FIGS. 2 and 5, and illustrates a procedure for attaching the sprinkler head 24 to the water-intake valve 22, according to an embodiment.

Figure 7:
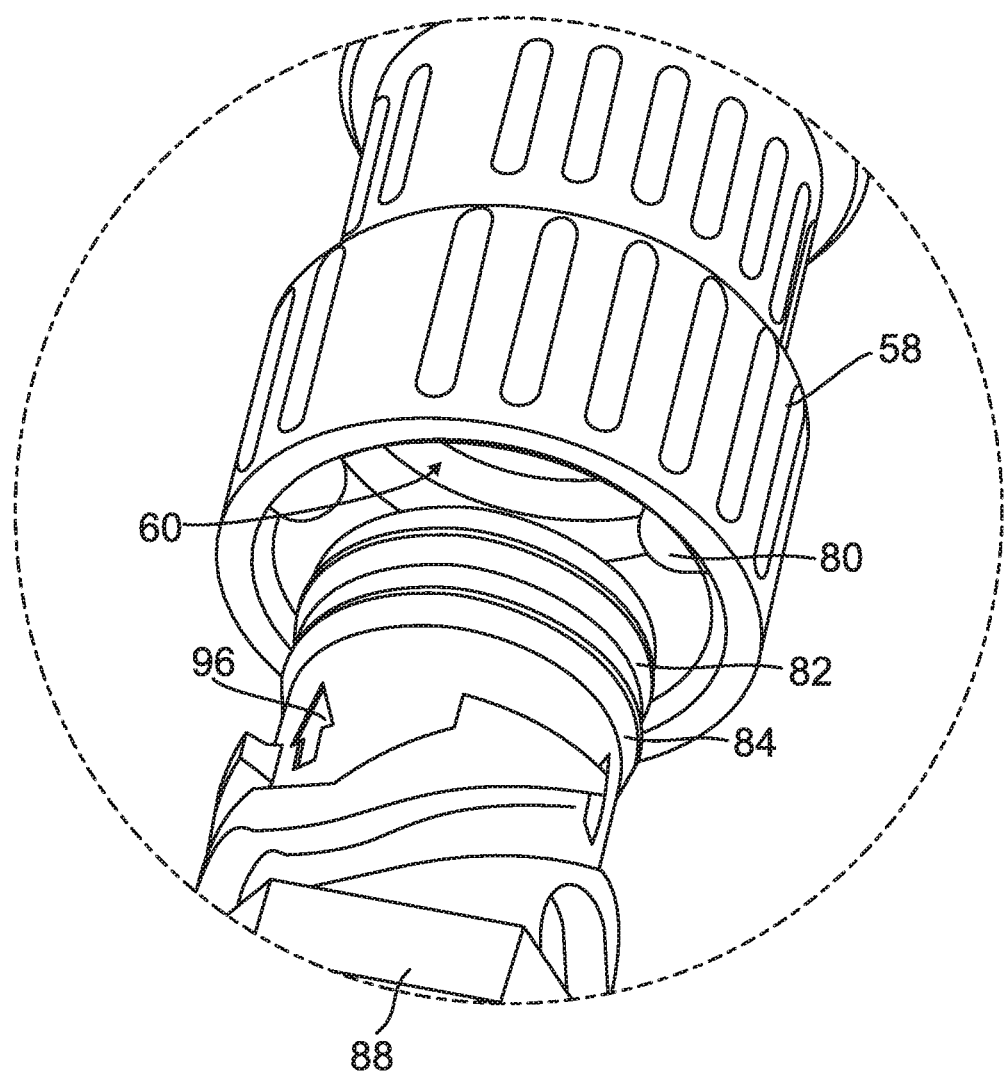
FIG. 7 is a close-up exploded isometric view illustrating a procedure for attaching the sprinkler head to the water-intake valve, according to an embodiment.

FIG. 7 is a close-up of a portion of the exploded isometric view of FIG. 6, according to an embodiment.

Figure 8:
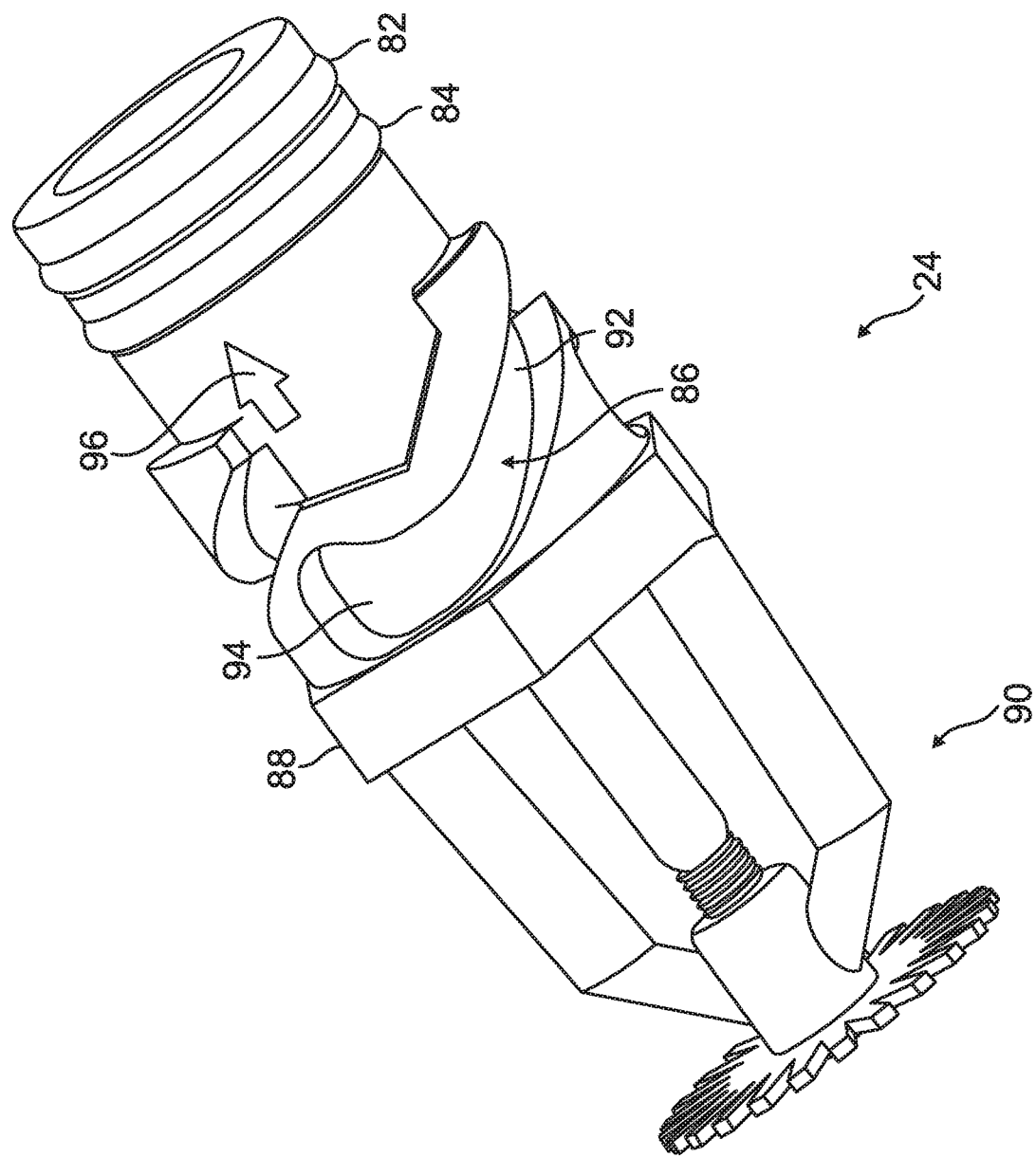
FIG. 8 is an isometric view of the sprinkler head of FIGS. 2 and 6-7, according to an embodiment.

FIG. 8 is an isometric view of the sprinkler head 24 of FIGS. 6-7, according to an embodiment.

Figure 9:
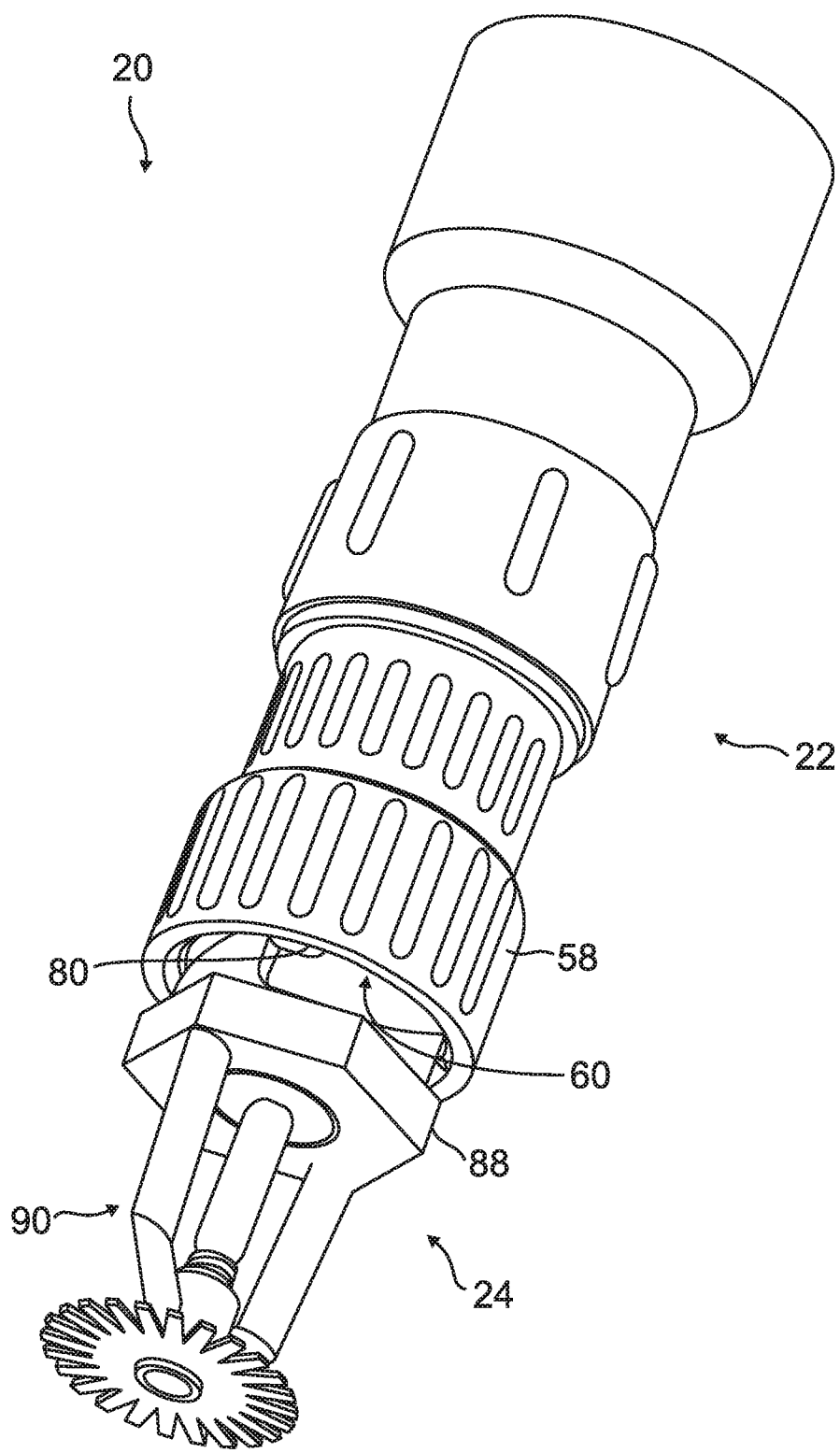
FIG. 9 is an isometric view of the sprinkler-head assembly of FIGS. 2 and 6-7 with the sprinkler head attached to the water-intake valve after completion of the attachment procedure described above in conjunction with FIGS. 6-8, according to an embodiment.

FIG. 9 is an isometric view of the sprinkler-head assembly 20 of FIGS. 6-7 with the sprinkler head 24 attached to (e.g., installed in) the water-intake valve 22 after completion of the attachment procedure described above in conjunction with FIGS. 6-8, according to an embodiment.

Figure 10:
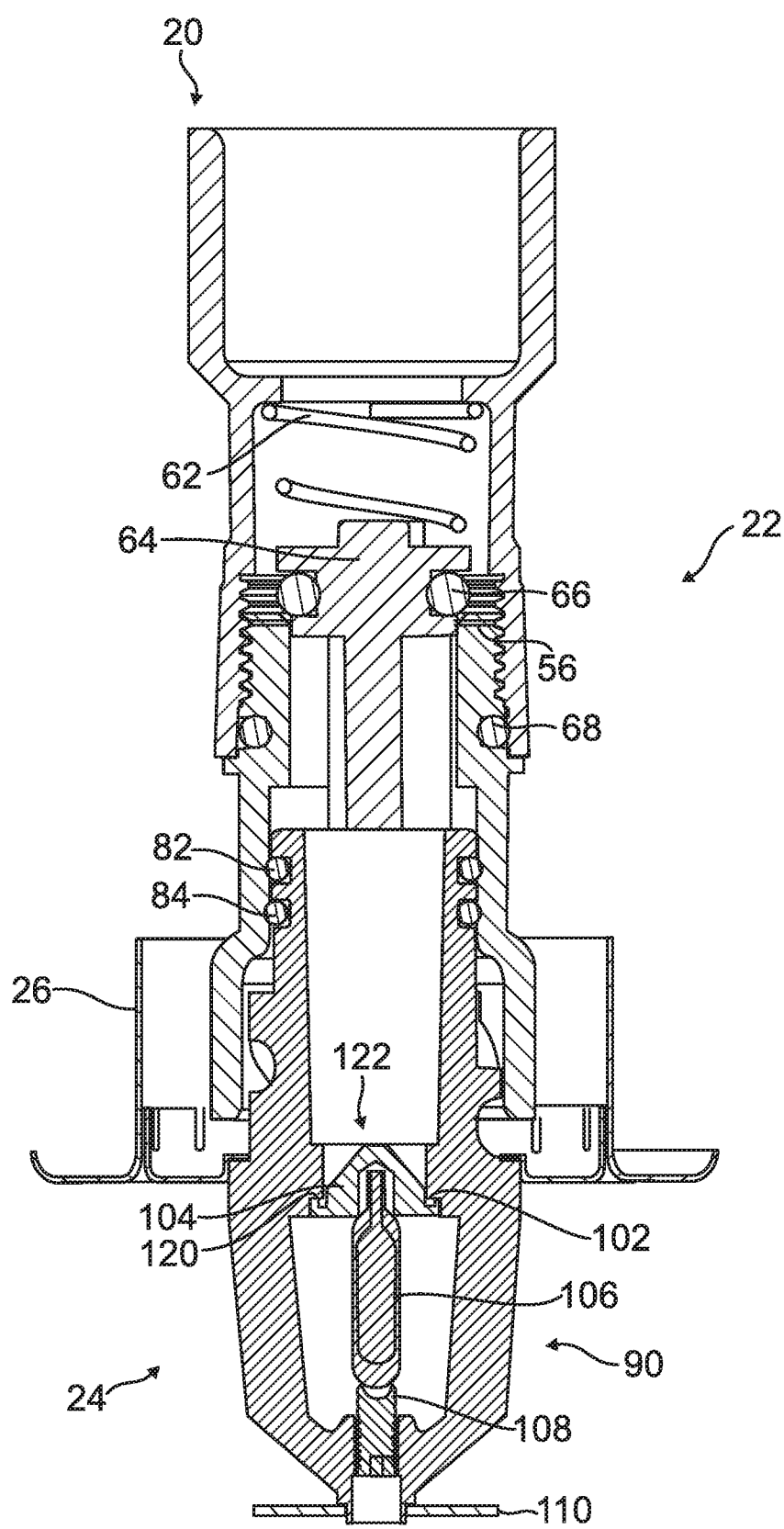
FIG. 10 is a cutaway side view of the sprinkler-head assembly of FIG. 9, according to an embodiment.

FIG. 10 is a cutaway side view of the sprinkler-head assembly 20 of FIG. 9, according to an embodiment.

Referring to FIGS. 6-10, the bottom 58 of the valve body 42 includes protrusions 80 (three protrusions in the described embodiment) disposed approximately equidistantly around an inner periphery of the receptacle 60. As described below, the protrusions 80 are configured to engage, and to hold in place, the sprinkler head 24.

The sprinkler head 24 includes a pair of seals 82 and 84, a set of spiral grooves 86, a hexagonal region 88, and a sensor-and-spreader assembly 90.

The seals 82 and 84 prevent water leakage while the sprinkler head 24 is installed within the receptacle 60 of the valve body 42, and also prevent "blowback" of water during the installation and removal of the sprinkler head into/from the receptacle.

Each of the spiral grooves 86 is configured to engage a respective one of the protrusions 80; therefore, the number of grooves typically equals the number of protrusions. Each groove 86 includes a guide section 92 configured to guide the movement of the sprinkler head 24 relative to the valve body 42 during installation and removal of the sprinkler head, and a hold section 94 configured to secure the sprinkler head in a secured position after the sprinkler head is installed.

The hexagonal region 88 is configured to engage a tool (not shown in FIGS. 6-10) configured to rotate the sprinkler head 24 into, and out from, the receptacle 60 of the valve body 42.

And the sensor-and-spreader assembly 90 is described below in conjunction with FIG. 11.

Still referring to FIGS. 6-10, procedures for installing the sprinkler head 24 in the receptacle 60, and for removing the sprinkler head from the receptacle, are described according to an embodiment. For purposes of example, it is assumed that the installation and removal procedures occur while the water-intake valve 22 is connected to a water supply via the fire-suppression system in which the water-intake valve is installed.

To install the sprinkler head 24, an installer (not shown in FIGS. 6-10) grasps the hexagonal region 88 in his hand, or engages the hexagonal region with a tool such as a wrench (not shown in FIGS. 6-10), and aligns an arrow 96 on the sprinkler head with an arbitrary one of the protrusions 80 in the receptacle 60.

Next, the installer (not shown in FIGS. 6-10) rotates the sprinkler head 24 in a clockwise direction. As the installer rotates the sprinkler head 24, protrusions 80 and the guide sections 92 of the grooves 86 convert the rotational force that the installer is applying into a linear force that urges the sprinkler head further into the receptacle 60. This linear force urges the plunger 64 upward, and, therefore, urges the seal 66 away from the sealing surface 56 to open the water-intake valve 22. But the dual seals 82 and 84 prevent water "blow by" from occurring, and from possibly "spraying" the installer.

As the installer (not shown in FIGS. 6-10) continues to rotate the sprinkler head 24 in a clockwise direction, eventually the respective hold section 94 of each groove 86 becomes aligned with a respective protrusion 80 and prevents the installer from further rotating the sprinkler head in a clockwise direction.

In response to sensing that he/she can rotate the sprinkler head 24 no further in the clockwise direction, the installer (not shown in FIGS. 6-10) releases the sprinkler head.

In response to the installer (not shown in FIGS. 6-10) releasing the sprinkler head 24, the water pressure from the fire-suppression system and the spring 62 urge the sprinkler head outward from the receptacle 60 until the protrusions 80 engage the upper edges of the hold regions 94 of the spiral grooves 86 and hold the sprinkler head in a stable, installed position as shown in FIGS. 9-10.

The sprinkler head 24 is now installed, and the water-intake valve 22 is open (i.e., the seal 66 is separated from the sealing surface 56) such that water is supplied to the sprinkler head 24 and is available for dispensing if the sprinkler head is activated by heat, such as the heat from a fire.

To remove the sprinkler head 24 from the water-intake valve 22, a remover (not shown in FIGS. 6-10) effectively performs the above-described installation procedure in reverse.

First, the remover (not shown in FIGS. 6-10) grasps the hexagonal region 88 in his hand, or engages the hexagonal region with a tool such as a wrench (not shown in FIGS. 6-10).

Next, the remover (not shown in FIGS. 6-10) rotates the sprinkler head 24 in a counterclockwise direction. As the installer rotates the sprinkler head 24, the hold sections 94 of the grooves 86 disengage the protrusions 80, which, together with the guide sections 92, convert the rotational force that the remover is applying into a linear force that adds to the forces exerted by the water pressure and the spring 62, respectively. This sum of forces urges the sprinkler head 24 further out of the receptacle 60. The sum of forces exerted by the water pressure and the spring 62 also urges the plunger 64 toward the receptacle 60, and, therefore, urges the plunger seal 66 toward and against the sealing surface 56 to close the water-intake valve 22. And the dual seals 82 and 84 prevent water "blow by" from occurring, and from possibly "spraying" the remover before the water-intake valve is fully closed.

As the remover continues to rotate the sprinkler head 24 in a counterclockwise direction, eventually the guide sections 92 of the grooves 86 disengage the protrusions 80 such that the sprinkler head is free of the grooves so that the remover can completely remove the sprinkler head from the receptacle 60.

Still referring to FIGS. 6-10, alternate embodiments of the sprinkler-head installation and removal procedures, the water-intake valve 22, and the sprinkler head 24 are contemplated. For example, during the installation procedure, instead of aligning the arrow 96 with one of the protrusions 80, an installer can insert the sprinkler head 24 into the receptacle 60, urge the sprinkler head into the receptacle, and rotate the sprinkler head in a clockwise direction until the guide portions 92 of the grooves 86 engage the protrusions 80, at which time the installer can stop urging the sprinkler head into the receptacle and just can continue to rotate the sprinkler head clockwise until the hold portions 94 of the grooves engage the protrusions. Furthermore, the grooves can be formed on a wall (e.g., inside wall or outside wall) of the receptacle 60, and the protrusions 80 can be formed on an opposite-type wall (e.g., outside wall or inside wall) of the sprinkler head 24. Moreover, the grooves 86 and protrusions 80 can be replaced, or supplemented, with any suitable engagement structure(s).

Figure 11:
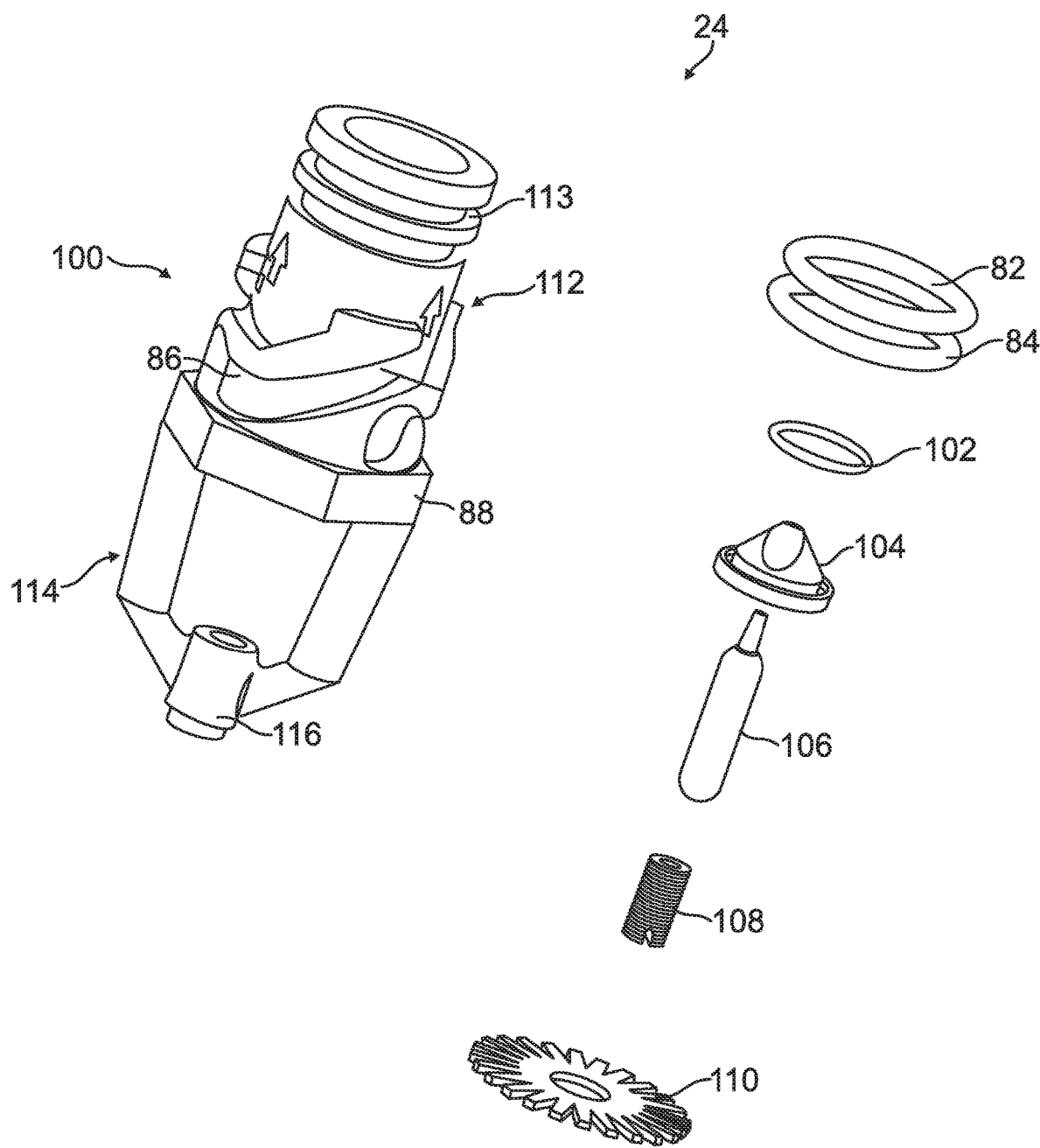
FIG. 11 is an exploded view of the sprinkler head of FIGS. 2 and 6-10, according to an embodiment.

FIG. 11 is an exploded view of the sprinkler head 24 of FIGS. 2 and 6-10, according to an embodiment.

The sprinkler head 24 includes a body 100, the seals 82 and 84, another seal 102, a seal seat 104, a heat sensor 106, an adjuster 108, and a water spreader 110.

The body 100 includes a connector portion 112 and a frame portion 114 that are formed integral to one another. The connector portion 112 includes the spiral grooves 86, the hexagonal region 88, and regions (e.g., seats) 113 for receiving and holding the seals 82 and 84. The frame portion includes a threaded portion 116, and the combination of the frame portion 114, seal 102, seal seat 104, heat sensor 106, adjuster 108, and water spreader 110 form the sensor-and-spreader assembly 90 (FIGS. 9-10). The body 100 can be formed from any suitable material(s) such as metal.

The seal 102 can be, for example, an O-ring, and can be made from any suitable material(s).

The seal seat 104 is configured to engage the seal 102, and can be made from any suitable material(s) such as metal.

The heat sensor 106 is configured to break, or otherwise to release pressure against the seal seat 104, in response to a temperature that exceeds a threshold temperature, such as 200° F.; the threshold temperature is within a range of temperatures typically generated by a fire. The heat sensor 106 can be made from any suitable material(s), and can have any configuration suitable to activate the heat sensor in response to an elevated temperature that equals or exceeds the threshold temperature. Because heat sensors suitable for use as the heat sensor 106 are known, the heat sensor is not further described herein.

The adjuster 108 engages the threaded portion 116 of the frame 114, and exerts a force on the seal seat 104, via the heat sensor 106, sufficient to form a watertight seal while the heat sensor 106 is intact. One can rotate the adjuster 108 by engaging an appropriate tool with a tool receptacle (not shown in FIG. 11) at the bottom of the adjuster so as to cause the adjuster to exert a suitable force on the seal seat 104. The adjuster 108 can be made from any suitable material(s) such as metal.

And the water spreader 110 is configured to spread water, which is released by the sprinkler head 24 in response to an activated heat sensor 106, in any pattern suitable to suppress or extinguish a fire. The spreader 110 can be formed from any suitable material(s) such as metal.

Referring to FIGS. 10-11, operation of the sprinkler head 24 is described, according to an embodiment.

While the heat sensor 108 is inactive/intact, the adjuster 108 urges the seal 102, via the heat sensor and the seal seat 104, against a sealing surface 120 with sufficient force for the seal and the sealing surface to form a watertight seal. Consequently, even though the water-intake valve 22 is open, no water flows out from the sprinkler head 24.

In response to heat that equals or exceeds a threshold temperature for which the heat sensor 106 is designed or otherwise configured, the heat sensor activates (e.g., partially or fully collapses) such that the force that the adjuster 108 applies to the seal 102 is no longer sufficient for the seal to form a watertight seal with the sealing surface 120.

Consequently, water flows from the fire-suppression system, through the open water-intake valve 22, and out through an opening 122 (the seal seat 104 and the seal 102 "plug" the opening 122 before the heat sensor 106 activates); the spreader 110 spreads the stream of water flowing through the opening 122 to wet a larger area than if the spreader were omitted.

Water continues to flow out of the sprinkler head 24 until either one closes the water supply to the fire-suppression system (or to the branch of the system in which the sprinkler head is located) or one removes the sprinkler head as described above in conjunction with FIGS. 6-10. After removing the sprinkler head 24, one may repair the sprinkler head by installing a new heat sensor 106 and adjusting the adjuster 108 (many municipal building codes forbid installation of a repaired or refurbished sprinkler head, however).

Still referring to FIGS. 10-11, alternate embodiments of the sprinkler head 24 are contemplated.

Figure 12:
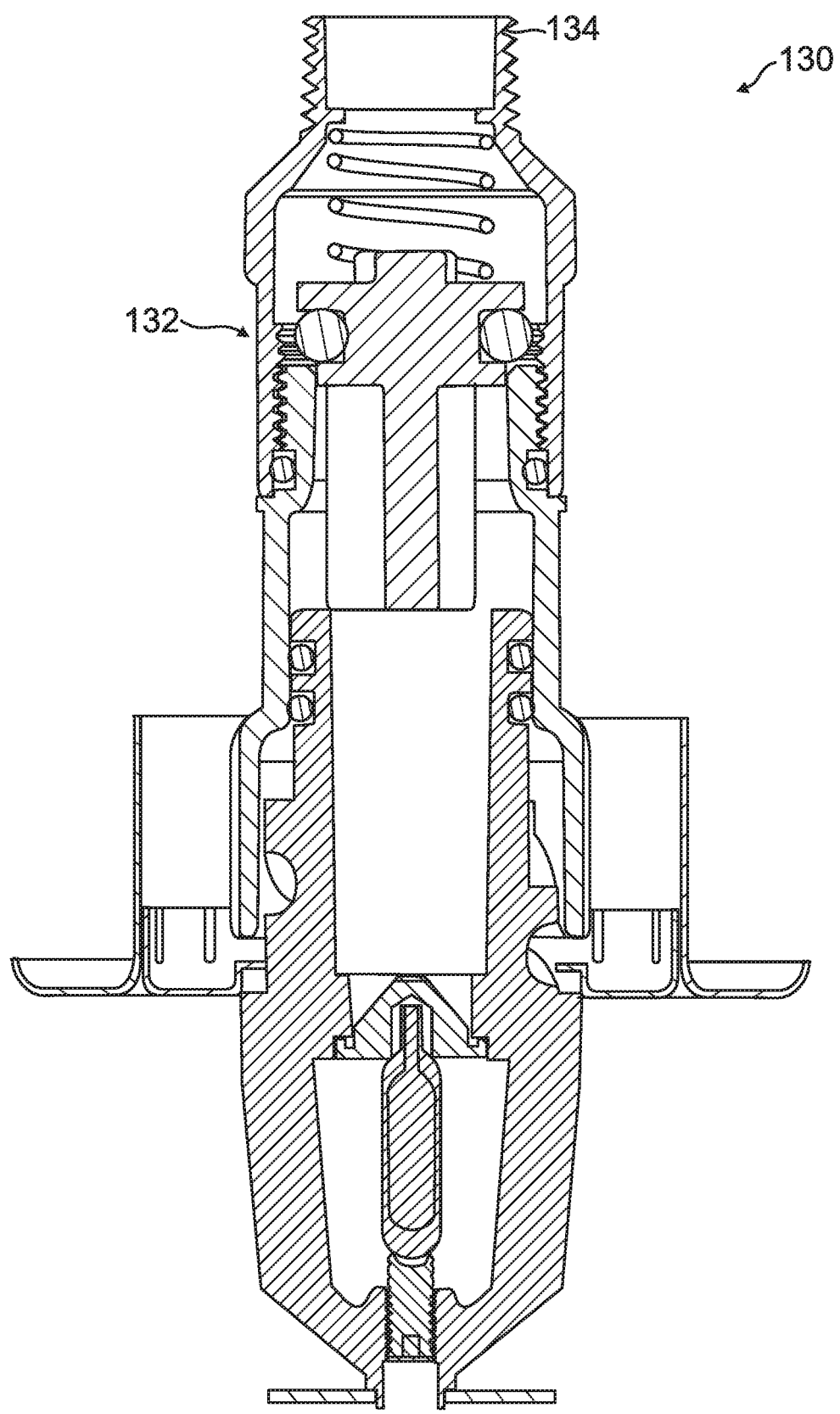
FIG. 12 is a cutaway side view of the sprinkler-head assembly of FIG. 10 but with a threaded system connector, according to an embodiment.

FIG. 12 is a cutaway side view of a sprinkler-head assembly 130, according to an embodiment. The sprinkler-head assembly 130 is similar to the sprinkler-head assembly 20 of FIGS. 2 and 5-10 except that the sprinkler-head assembly 130 includes a connector 132 with threads 134 configured for engaging a threaded extension pipe of a fire-suppression system.

Figure 13:
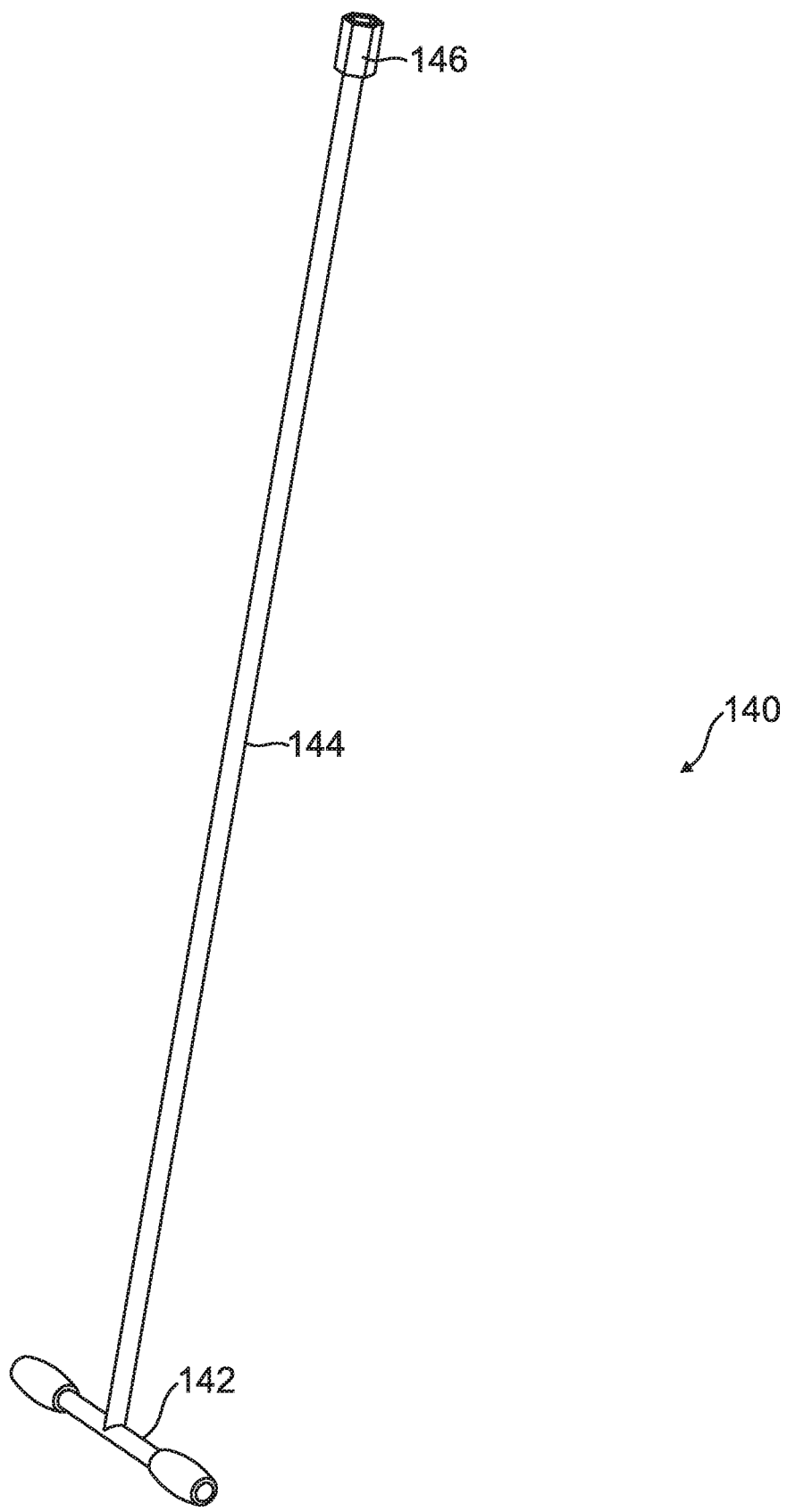
FIG. 13 is an isometric view of a tool for installing and removing the sprinkler head of FIGS. 2 and 6-12, according to an embodiment.

FIG. 13 is an isometric view of a tool 140 configured to install and remove the sprinkler head 24 of FIGS. 2 and 6-12, according to an embodiment. The tool 140 includes a handle 142, a shaft 144, and a hexagonal drive head 146 configured to receive and engage the hexagonal region 88 (e.g., FIG. 11) of the sprinkler head 24. The shaft 144 can be of any length suitable to allow one to install and remove a sprinkler head 24 without a ladder. The handle 142, shaft 144, and drive head 146 each can be made from any suitable material(s) such as metal or plastic, and one or more of these components can be made from the same, or from different, materials as compared to the other ones of these components.

Figure 14:
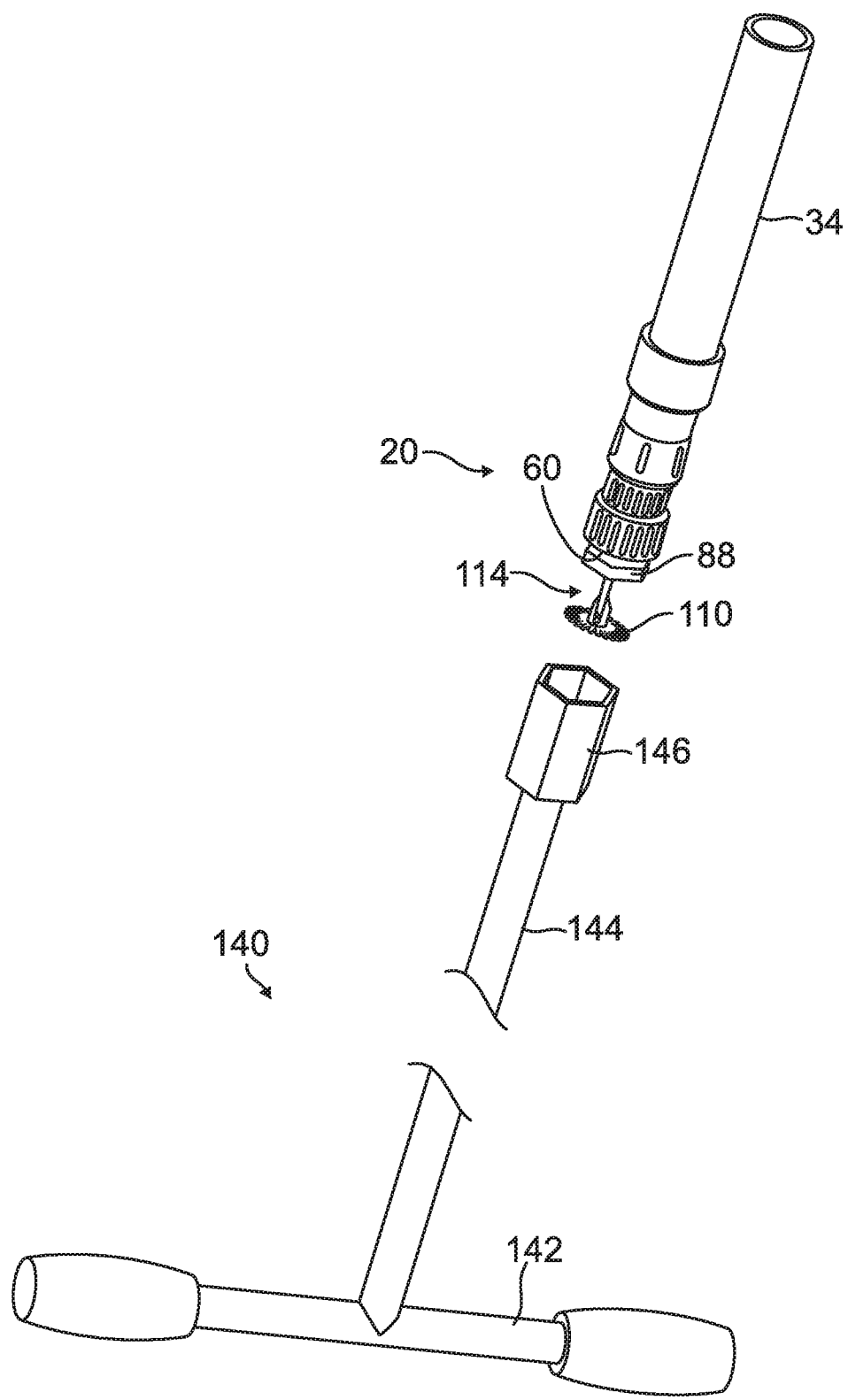
FIG. 14 is an isometric view of a sprinkler-head section of a fire-suppression system and of the tool of FIG. 13, and illustrates procedures for installing and removing the sprinkler head of FIGS. 2 and 6-12 with the tool, according to an embodiment.

FIG. 14 is an exploded view of the tool 140 of FIG. 13 and the sprinkler-head assembly 20 attached to an extension pipe 34, according to an embodiment.

Referring to FIGS. 13-14, procedures are described for installing and removing the sprinkler head 24 using the tool 140, according to an embodiment.

To remove the sprinkler head 24, one first places the drive head 146 against the hexagonal region 88, and rotates the tool 140 in either a clockwise or counterclockwise direction until the drive head engages the hexagonal region (the drive head is deep enough and wide enough to receive the spreader 110 and the frame 114).

Next, one rotates the tool counterclockwise to remove the sprinkler head 24 in a manner similar to that described above in conjunction with FIGS. 6-10. As long as one maintains the shaft 142 of the tool 140 substantially vertical, the drive head 146 holds the sprinkler head 24 until he/she can lower the tool and remove the sprinkler head from the drive head.

As described above in conjunction with FIGS. 6-10, in response to removing the sprinkler head 24, the water-intake valve 22 automatically closes to prevent water from spraying, or otherwise leaking, out of the water-intake valve.

To install the sprinkler head 24, one first aligns the hexagonal region 88 with the drive head 146, and inserts the hexagonal region into the drive head such that the drive head is holding the sprinkler head.

Next, one raises the tool 140, aligns the sprinkler head 24 with the receptacle 60 of the water-intake valve 22 such that the arrow 96 (FIG. 8) is aligned with a protrusion 80 (FIG. 7), urges the sprinkler head into the receptacle, and rotates the tool clockwise until he/she can rotate the tool no further. If he/she cannot see the arrow, then he/she can rotate the tool counterclockwise until he/she feels the grooves 86 engage the protrusions 80, and then rotate the tool clockwise to install the sprinkler head 24 in the water-intake valve 22.

As described above in conjunction with FIGS. 6-10, in response to installing the sprinkler head 24, the water-intake valve 22 automatically opens such that the sprinkler head is connected to a water supply.

Then, one disengages the tool 140 from the installed sprinkler head 24 and lowers the tool.

Still referring to FIGS. 13-14, alternate embodiments of the tool 140, and of the sprinkler-head installation and removal procedures, are contemplated. For example, both the hexagonal region 88 and the drive head 146 can have shapes and configurations other than hexagonal with straight sides. Furthermore, the shaft 144 can be configured to have an adjustable length.

From the foregoing it will be appreciated that, although specific embodiments have been described herein for purposes of illustration, various modifications may be made without deviating from the spirit and scope of the disclosure. Furthermore, where an alternative is disclosed for a particular embodiment, this alternative may also apply to other embodiments even if not specifically stated. Moreover, one or more components of a described apparatus or system may have been omitted from the description for clarity or another reason. In addition, one or more components of a described apparatus or system that have been included in the description may be omitted from the apparatus or system.

Example Embodiments

Example 1 includes a fire-suppression water-intake valve, comprising: a receptacle configured to receive a sprinkler head; and a valve assembly configured to close in response to removing a sprinkler head from the receptacle.

Example 2 includes the fire-suppression water-intake valve of Example 1 wherein the receptacle includes: an inner wall; and protrusions protruding from the inner wall and each configured to engage a respective groove of a sprinkler head.

Example 3 includes the fire-suppression water-intake valve of any of Examples 1-2 wherein the valve assembly is configured to open in response to installing a sprinkler head in the receptacle.

Example 4 includes the fire-suppression water-intake valve of any of Examples 1-3 wherein the valve assembly includes: a sealing surface; and a sealing ring configured to form a seal with the sealing surface in response to removing a sprinkler head from the receptacle.

Example 5 includes the fire-suppression water-intake valve of any of Examples 1-4 wherein the valve assembly includes: a sealing surface; a sealing ring; and a plunger configured to urge the sealing ring against the sealing surface in response to pressure from a fluid in a fire-suppression system.

Example 6 includes the fire-suppression water-intake valve of Example 5 wherein the sealing ring is disposed over the plunger.

Example 7 includes the fire-suppression water-intake valve of Example 5, further comprising: a spring; and wherein the plunger is configured to urge the sealing ring against the sealing surface in response to the spring.

Example 8 includes the fire-suppression water-intake valve of any of Examples 1-7, further comprising: a coupling section; a receptacle section configured for coupling to the coupling section and including the receptacle and a sealing surface; a first sealing ring configured for disposition between overlapping sides of the coupling section and the receptacle section; and a valve assembly configured for disposition inside of the coupling section and the receptacle section, including plunger, a second sealing ring configured for disposition around the plunger, and a spring configured to urge the plunger and the second sealing ring toward the sealing surface.

Example 9 includes the fire-suppression water-intake valve of Example 8 wherein: the coupling section includes first threads; and the receptacle section includes second threads configured to engage the first threads.

Example 10 includes a fire-suppression water-intake valve, comprising: a receptacle configured to receive a sprinkler head; and a valve assembly configured to open in response to installing a sprinkler head in the receptacle.

Example 11 includes a fire-suppression water-intake valve, comprising: a receptacle configured to receive a sprinkler head; and a valve assembly configured to be closed in response to an absence of a sprinkler head from the receptacle.

Example 12 includes a fire-suppression sprinkler head, comprising: a body; and at least one first engager configured to engage a fire-suppression water-intake valve and to cause the body to open the fire-suppression water-intake valve.

Example 13 includes the fire-suppression sprinkler head of Example 12 wherein the at least one first engager includes grooves: formed in the body; configured to engage respective protrusions from the fire-suppression water-intake valve; and configured to cause the body to open the fire-suppression water-intake valve in response to a rotation of the body.

Example 14 includes the fire-suppression sprinkler head of any of Examples 12-13 wherein the at least one first engager includes protrusions: formed in the body; configured to engage respective grooves of the fire-suppression water-intake valve; and configured to cause the body to open the fire-suppression water-intake valve in response to a rotation of the body.

Example 15 includes the fire-suppression sprinkler head of Examples 12-14, further comprising at least one seal seat formed in the body and each configured to receive a respective one of at least one sealing ring.

Example 16 includes the fire-suppression sprinkler head of any of Examples 12-15, further comprising: a fluid-dispensing opening disposed in the body; a sealing surface disposed around the fluid-dispensing opening; a seal seat; a sealing ring disposed on the seal seat; and a heat sensor configured to urge the seal seat toward the fluid-dispensing opening such that the sealing ring forms a seal with the sealing surface, and configured to allow the seal to break in response to a temperature that is greater than or equal to a threshold temperature.

Example 17 includes a fire-suppression sprinkler head, comprising: a body; and at least one first engager configured to engage a fire-suppression water-intake valve and to urge the body into the fire-suppression water-intake valve.

Example 18 includes the fire-suppression sprinkler head of Example 17 wherein the at least one first engager includes grooves: formed in the body; configured to engage respective protrusions from the fire-suppression water-intake valve; and configured to urge the body into the fire-suppression water-intake valve in response to a rotation of the body.

Example 19 includes the fire-suppression sprinkler head of any of Examples 17-18 wherein the at least one first engager includes protrusions: formed in the body; configured to engage respective grooves of the fire-suppression water-intake valve; and configured to urge the body into the fire-suppression water-intake valve in response to a rotation of the body.

Example 20 includes a fire-suppression sprinkler-head assembly, comprising: a fire-suppression sprinkler head; and a first-suppression water-intake valve having a receptacle, configured to close in response to removing the sprinkler head from the receptacle, and configured to open in response to inserting the sprinkler head into the receptacle.

Example 21 includes a fire-suppression system, comprising: a fluid-distribution system; and a fire-suppression sprinkler-head assembly in fluid-communication with the fluid-distribution system and including a fire-suppression sprinkler head, and a first-suppression water-intake valve having a receptacle, configured to close in response to removing the sprinkler head from the receptacle, and configured to open in response to inserting the sprinkler head into the receptacle.

Example 22 includes a system, comprising: a structure; and a fire-suppression system disposed in the structure and including a fluid-distribution system, and a fire-suppression sprinkler-head assembly in fluid-communication with the fluid-distribution system and including a fire-suppression sprinkler head, and a first-suppression water-intake valve having a receptacle, configured to close in response to removing the sprinkler head from the receptacle, and configured to open in response to inserting the sprinkler head into the receptacle.

Example 23 includes the system of Example 22 wherein the structure includes a building.

Example 24 includes a method, comprising: removing a fire-suppression sprinkler head from a fire-suppression water-intake valve; and closing the fire-suppression water-intake valve in response to the removing.

Example 25 includes the method of Example 24 wherein removing the fire-suppression sprinkler head includes rotating the fire-suppression sprinkler head relative to the fire-suppression water-intake valve.

Example 26 includes the method of any of Examples 24-25 wherein closing the fire-suppression water-intake valve includes allowing a fluid in a system in which the fire-suppression water-intake valve is installed to close the fire-suppression water-intake valve.

Example 27 includes a method, comprising: inserting a fire-suppression sprinkler head into a fire-suppression water-intake valve; and opening the fire-suppression water-intake valve in response to the inserting.

Example 28 includes the method of Example 27 wherein inserting the fire-suppression sprinkler head includes rotating the fire-suppression sprinkler head relative to the fire-suppression water-intake valve.

Example 29 includes the method of any of Examples 27-28 wherein opening the fire-suppression water-intake valve includes applying a pressure that is opposite to, and greater than, a pressure generated by a fluid in a system in which the fire-suppression water-intake valve is installed.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited by the claims and the equivalents thereof.

What is claimed is:

1. A fire-suppression water-intake valve, comprising:
   a receptacle configured to receive a fire-suppression sprinkler head including a side and grooves formed partially through the side, the receptacle including
      an inner wall, and
      discontinuous protrusions protruding from the inner wall and each configured to engage a respective groove of the grooves of the fire-suppression sprinkler head such that the fire-suppression sprinkler head is removable while under pressure; and
   a valve assembly
      removable while the fire-suppression water-intake valve is installed as part of a fire-suppression sprinkler system,
      configured
         to close in response to removing the fire-suppression sprinkler head from the receptacle, and
         to open in response to installing the fire-suppression sprinkler head in the receptacle, and
      including
         a sealing surface,
         an O-ring,
         a spring, and
         a plunger having a spring engager and configured to urge the O-ring, which is disposed over the plunger, against the sealing surface in response to the spring and pressure from a fluid in a fire-suppression system.

2. The fire-suppression water-intake valve of claim 1 wherein the O-ring is configured to form a seal with the sealing surface in response to removing the sprinkler head from the receptacle.

3. The fire-suppression water-intake valve of claim 1, further comprising:
   a coupling section;
   a receptacle section configured for coupling to the coupling section and including the receptacle and the sealing surface;
   a sealing ring configured for disposition between overlapping sides of the coupling section and the receptacle section; and
   the valve assembly being configured for disposition inside of the coupling section and the receptacle section.

4. The fire-suppression water-intake valve of claim 3 wherein:
   the coupling section includes first threads; and
   the receptacle section includes second threads configured to engage the first threads.

5. A fire-suppression water-intake valve, comprising:
   a receptacle configured to receive a fire-suppression sprinkler head including an outer wall and grooves formed in, but not through, the outer wall, and a region configured to engage a tool, the receptacle including
      an inner wall, and
      protrusions protruding from the inner wall at approximately a same level, each of the protrusions configured to engage a respective groove of the grooves of the fire-suppression sprinkler head such that the fire-suppression sprinkler head is removable from the receptacle with the tool while the fire-suppression sprinkler head is experiencing water pressure; and
   a valve assembly
      configured
         to be closed in response to an absence of the fire-suppression sprinkler head from the receptacle, and
         to be open in response to a presence of the fire-suppression sprinkler head in the receptacle, and
      including
         a sealing surface,
         an O-ring,
         a spring, and
         a plunger, over which the O-ring is disposed, having a spring guide and configured to urge the O-ring against the sealing surface in response to the spring and pressure of a fluid in a fire-suppression system.

6. A fire-suppression sprinkler-head assembly, comprising:
a fire-suppression sprinkler head including grooves formed part-way through a head side and a region configured to receive an installation-and-removal tool; and
a fire-suppression water-intake valve
having a receptacle including
an inner wall, and
discontinuous protrusions extending from the inner wall, each of the discontinuous protrusions configured to engage a respective groove of the grooves of the fire-suppression sprinkler head such that the fire-suppression sprinkler head is removable from the receptacle while under pressure using the tool,
configured
to close in response to removing the fire-suppression sprinkler head from the receptacle, and
to open in response to inserting the fire-suppression sprinkler head into the receptacle, and
including
a sealing surface,
an O-ring,
a spring, and
a plunger having a spring guide and configured to close the fire-suppression water-intake valve by urging the O-ring, which is disposed over the plunger, against the sealing surface in response to the spring and pressure from a fluid in a fire-suppression system.

7. A fire-suppression system, comprising:
a fluid-distribution system; and
a fire-suppression sprinkler-head assembly in fluid communication with the fluid-distribution system and including
a fire-suppression sprinkler head including grooves formed part-way through a head wall, and
a fire-suppression water-intake valve
having a receptacle including
an inner wall, and
protrusions extending from the inner wall at approximately a same level, each of the protrusions configured to engage a respective groove of the grooves of the fire-suppression sprinkler head such that the fire-suppression sprinkler head is removable while the fluid-distribution system is pressurized,
having a valve assembly installable while a portion of the fire-suppression sprinkler-head assembly is attached to the fluid distribution system, the valve assembly
configured
to close in response to removing the fire-suppression sprinkler head from the receptacle, and
to open in response to inserting the fire-suppression sprinkler head into the receptacle, and
including
a sealing surface,
an O-ring,
a spring, and
a plunger, over which the O-ring is disposed, having a spring guide and configured to close the valve assembly by urging the O-ring against the sealing surface in response to the spring and pressure from a fluid in the fluid-distribution system.

8. A system, comprising:
a structure; and
a fire-suppression system disposed in the structure and including a fluid-distribution system, and
a fire-suppression sprinkler-head assembly in fluid-communication with the fluid-distribution system and including
a fire-suppression sprinkler head including a side and grooves formed in, but not through, the side, and an installation-removal region, and
a fire-suppression water-intake valve
having a receptacle including
an inner wall, and
discontinuous protrusions extending from the inner wall, each of the discontinuous protrusions configured to engage a respective groove of the grooves of the fire-suppression sprinkler head so that the fire-suppression sprinkler head is removable from the receptacle while there is pressurized fluid in the fluid-distribution system with a tool engaging the installation-removal region,
removable while a portion of the fire-suppression sprinkler-head assembly is attached to the fluid distribution system,
configured
to close in response to removing the fire-suppression sprinkler head from the receptacle, and
to open in response to inserting the fire-suppression sprinkler head into the receptacle, and
including
a sealing surface,
an O-ring,
a spring, and
a plunger, over which the O-ring is disposed, having a guide configured to engage the spring and configured to urge the O-ring against the sealing surface in response to the spring and pressure of a fluid in the fire-suppression sprinkler-head assembly.

9. The system of claim 8 wherein the structure includes a building.

10. The fire-suppression water-intake valve of claim 6 wherein the protrusions are discontinuous.

11. The fire-suppression water-intake valve of claim 6 wherein the O-ring is configured to form a seal with the sealing surface in response to removing the sprinkler head from the receptacle.

12. The fire-suppression water-intake valve of claim 6, further comprising:
a coupling section;
a receptacle section configured for coupling to the coupling section and including the receptacle and the sealing surface;
a sealing ring configured for disposition between overlapping sides of the coupling section and the receptacle section; and
the valve assembly being configured for disposition inside of the coupling section and the receptacle section.

13. The fire-suppression water-intake valve of claim 12 wherein:
the coupling section includes first threads; and
the receptacle section includes second threads configured to engage the first threads.

14. The fire-suppression water-intake valve of claim 1, further comprising:
 a coupling section;
 a receptacle section configured for coupling to the coupling section and including the receptacle and the sealing surface;
 another O-ring configured for disposition between overlapping sides of the coupling section and the receptacle section; and
 the valve assembly configured for disposition inside of the coupling section and the receptacle section.

15. The fire-suppression sprinkler-head assembly of claim 6 wherein each of the grooves of the fire-suppression sprinkler head includes:
 a respective guide section configured to engage a respective one of the discontinuous protrusions; and
 a respective hold section disposed at an end of the respective guide section and configured to engage the respective one of the discontinuous protrusions.

16. The fire-suppression sprinkler-head assembly of claim 6 wherein the fire-suppression sprinkler head is configured to prevent fluid blow by while being inserted into the receptacle.

17. The fire-suppression sprinkler-head assembly of claim 6 wherein the fire-suppression sprinkler head is configured to prevent fluid blow by while being removed from the receptacle.

18. The fire-suppression sprinkler-head assembly of claim 6 wherein the fire-suppression sprinkler head includes a seal configured to prevent fluid blow by while being inserted into the receptacle and while being removed from the receptacle.

19. The fire-suppression sprinkler-head assembly of claim 6 wherein the fire-suppression sprinkler head includes dual seals configured to prevent fluid blow by while being inserted into, and while being removed from, the receptacle.

20. The fire-suppression sprinkler-head assembly of claim 6 wherein the region is hexagonal.

* * * * *